(12) United States Patent
Shen et al.

(10) Patent No.: US 9,380,320 B2
(45) Date of Patent: Jun. 28, 2016

(54) FREQUENCY DOMAIN SAMPLE ADAPTIVE OFFSET (SAO)

(71) Applicant: Broadcom Corporation, Irvine, CA (US)

(72) Inventors: Ba-Zhong Shen, Irvine, CA (US); Wade K. Wan, Orange, CA (US); Peisong Chen, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 580 days.

(21) Appl. No.: 13/623,765

(22) Filed: Sep. 20, 2012

(65) Prior Publication Data

US 2013/0208810 A1  Aug. 15, 2013

Related U.S. Application Data

(60) Provisional application No. 61/597,683, filed on Feb. 10, 2012, provisional application No. 61/603,190, filed on Feb. 24, 2012.

(51) Int. Cl.
*H04N 7/12* (2006.01)
*H04N 19/86* (2014.01)
*H04N 19/48* (2014.01)
*H04N 19/82* (2014.01)

(52) U.S. Cl.
CPC ............. *H04N 19/86* (2014.11); *H04N 19/48* (2014.11); *H04N 19/82* (2014.11)

(58) Field of Classification Search
USPC .................................................. 375/240.25
See application file for complete search history.

(56) References Cited

U.S. PATENT DOCUMENTS

| 5,793,506 A * | 8/1998 | Schmid ............................ 398/72 |
| 2003/0088400 A1* | 5/2003 | Nishio et al. .................. 704/201 |
| 2009/0079855 A1* | 3/2009 | Ito et al. ......................... 348/265 |
| 2010/0114583 A1* | 5/2010 | Lee et al. ....................... 704/500 |

(Continued)

FOREIGN PATENT DOCUMENTS

KR  20000062277 A  10/2000

OTHER PUBLICATIONS

Fu et al.; Sample Adaptive Offset for HEVC; IEEE 13th International Workshop on Multimedia Signal Processing (MMSP); Oct. 17, 2011; pp. 1-5.

(Continued)

*Primary Examiner* — Tracy Li
(74) *Attorney, Agent, or Firm* — Garlick & Markison; Shayne X. Short

(57) ABSTRACT

Frequency domain sample adaptive offset (SAO). Video processing of a first signal operates to generate a second video signal such that at least one characteristic of a first portion of video information of the first video signal is replicated in generating a second portion of video information, such that the first portion of video information and the second portion of video information undergo combination to generate the second video signal. Such use of the first video signal may involve replication and scaling of the first video information to generate the second portion of video information. One possible characteristic of the first portion of video information may correspond to an energy profile as a function of frequency. One or more portions of the first video signal may be employed to generate different respective portions of the second signal. Such video processing operations may be performed on a block by block basis.

20 Claims, 20 Drawing Sheets

(56) References Cited

U.S. PATENT DOCUMENTS

2011/0173006 A1* 7/2011 Nagel et al. .................. 704/500
2011/0305274 A1   12/2011 Fu et al.
2012/0002720 A1* 1/2012 Zhao et al. ............... 375/240.03

OTHER PUBLICATIONS

Kim et al.; Non-CE8: New Chroma Band Offset (BO) Design in SAO; JCT-VC Meeting, MPEG Meeting; Joint Collaborative Team on Video Coding of ISO/IEC JTC1/SC29/WG11 and ITU-T SG.16); Jan. 21, 2012; pp. 1-8.

Dietz, et al.; Spectral Band Replication, A Novel Approach in Audio Coding; Audio Engineering Society Convention Paper; May 10, 2002, pp. 1-08; vol. 112, No. 5553.

European Patent Office; European Search Report; EP Application No. 13000609.1; Jun. 3, 2013; 3 pgs.

European Patent Office; European Search Report; EP Application No. 13000380.9; Jun. 3, 2013; 2 pgs.

* cited by examiner

• principles of spectral band replication (SBR) – transposition(a) and reconstruction(b)

employing a first subset of the first at least a portion of video information of a first video signal to generate a first subset of the second at least a portion of video information within a first relatively higher frequency range than the first at least a portion of video information in accordance with generating a second video signal 2010 employing a second subset of the first at least a portion of video information of the first video signal to generate a second subset of the second at least a portion of video information within a second relatively higher frequency range than the first at least a portion of video information in accordance with generating a second video signal 2020

FIG. 20A

employing a first at least a portion of video information of a first video signal to generate a first subset of a second at least a portion of video information within a first relatively higher frequency range than the first at least a portion of video information in accordance with generating a second video signal 2011 employing the first at least a portion of video information of a first video signal to generate a second subset of the second at least a portion of video information within a second relatively higher frequency range than the first at least a portion of video information in accordance with generating a second video signal 2021

FIG. 20B

FREQUENCY DOMAIN SAMPLE ADAPTIVE OFFSET (SAO)

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:

1. U.S. Provisional Patent Application Ser. No. 61/597,683, entitled "Frequency domain sample adaptive offset," filed Feb. 10, 2012.

2. U.S. Provisional Patent Application Ser. No. 61/603,190, entitled "Frequency domain sample adaptive offset (SAO)," filed Feb. 24, 2012.

INCORPORATION BY REFERENCE

The following standards/draft standards are hereby incorporated herein by reference in their entirety and are made part of the present U.S. Utility patent application for all purposes:

1. "High efficiency video coding (HEVC) text specification draft 6," Joint Collaborative Team on Video Coding (JCT-VC) of ITU-T SG16 WP3 and ISO/IEC JTC1/SC29/WG11, 7th Meeting: Geneva, CH, 21-30 Nov. 2011, Document: JCTVC-H1003, 259 pages.

2. International Telecommunication Union, ITU-T, TELECOMMUNICATION STANDARDIZATION SECTOR OF ITU, H.264 (March/2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

BACKGROUND OF THE INVENTION

1. Technical Field of the Invention

The invention relates generally to digital video processing; and, more particularly, it relates to processing and operations in accordance with such digital video processing.

2. Description of Related Art

Communication systems that operate to communicate digital media (e.g., images, video, data, etc.) have been under continual development for many years. With respect to such communication systems employing some form of video data, a number of digital images are output or displayed at some frame rate (e.g., frames per second) to effectuate a video signal suitable for output and consumption. Within many such communication systems operating using video data, there can be a trade-off between throughput (e.g., number of image frames that may be transmitted from a first location to a second location) and video and/or image quality of the signal eventually to be output or displayed. The present art does not adequately or acceptably provide a means by which video data may be transmitted from a first location to a second location in accordance with providing an adequate or acceptable video and/or image quality, ensuring a relatively low amount of overhead associated with the communications, relatively low complexity of the communication devices at respective ends of communication links, etc.

BRIEF DESCRIPTION OF THE SEVERAL VIEWS OF THE DRAWINGS

FIG. 18, FIG. 19, FIG. 20A, and FIG. 20B illustrate various embodiments of methods for performing video processing (e.g., within one or more devices).

DETAILED DESCRIPTION OF THE INVENTION

Figure 1:
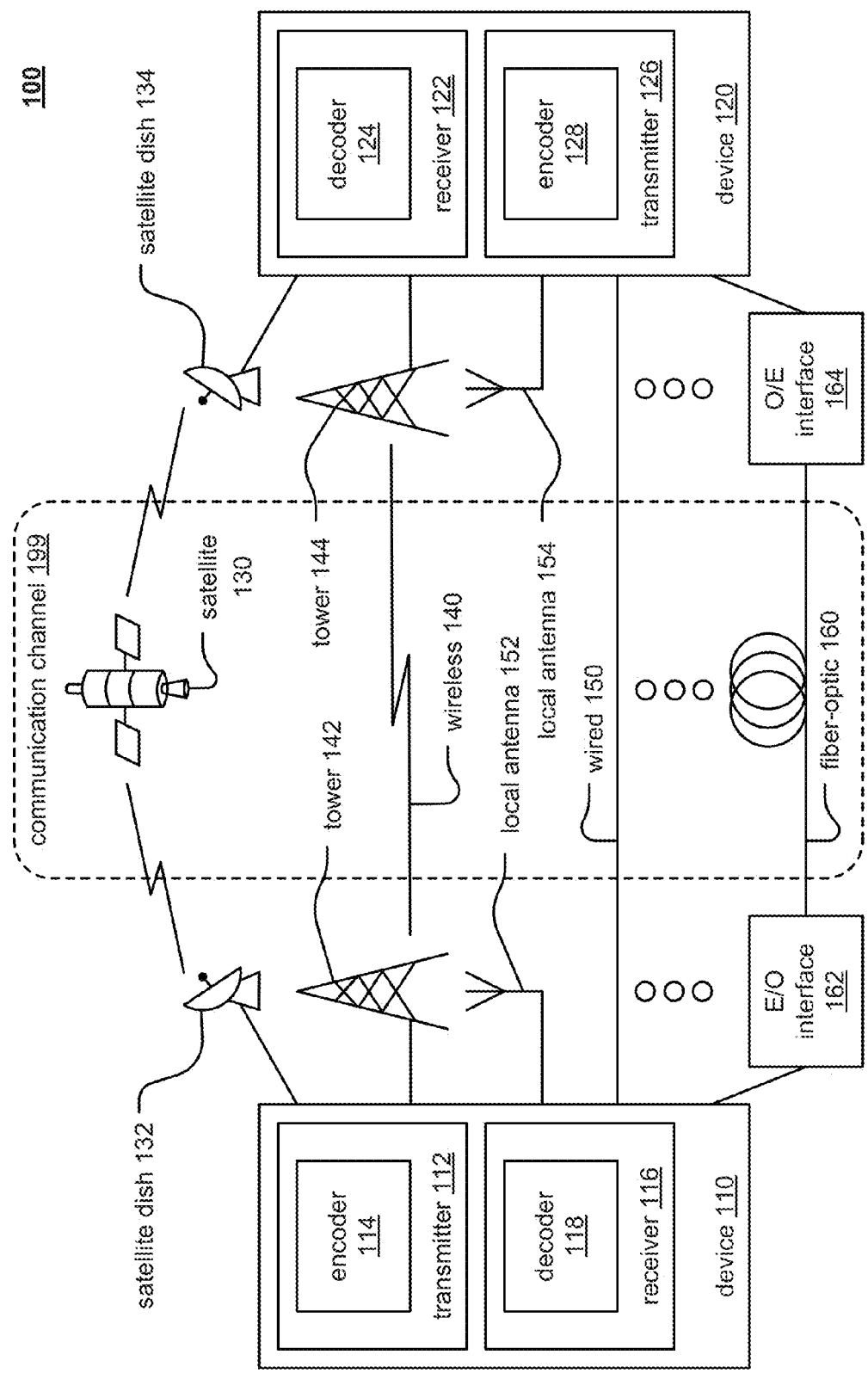
FIG. 1 and FIG. 2 illustrate various embodiments of communication systems.

Within many devices that use digital media such as digital video, respective images thereof, being digital in nature, are represented using pixels. Within certain communication systems, digital media can be transmitted from a first location to a second location at which such media can be output or displayed. The goal of digital communications systems, including those that operate to communicate digital video, is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media as well.

Figure 2:
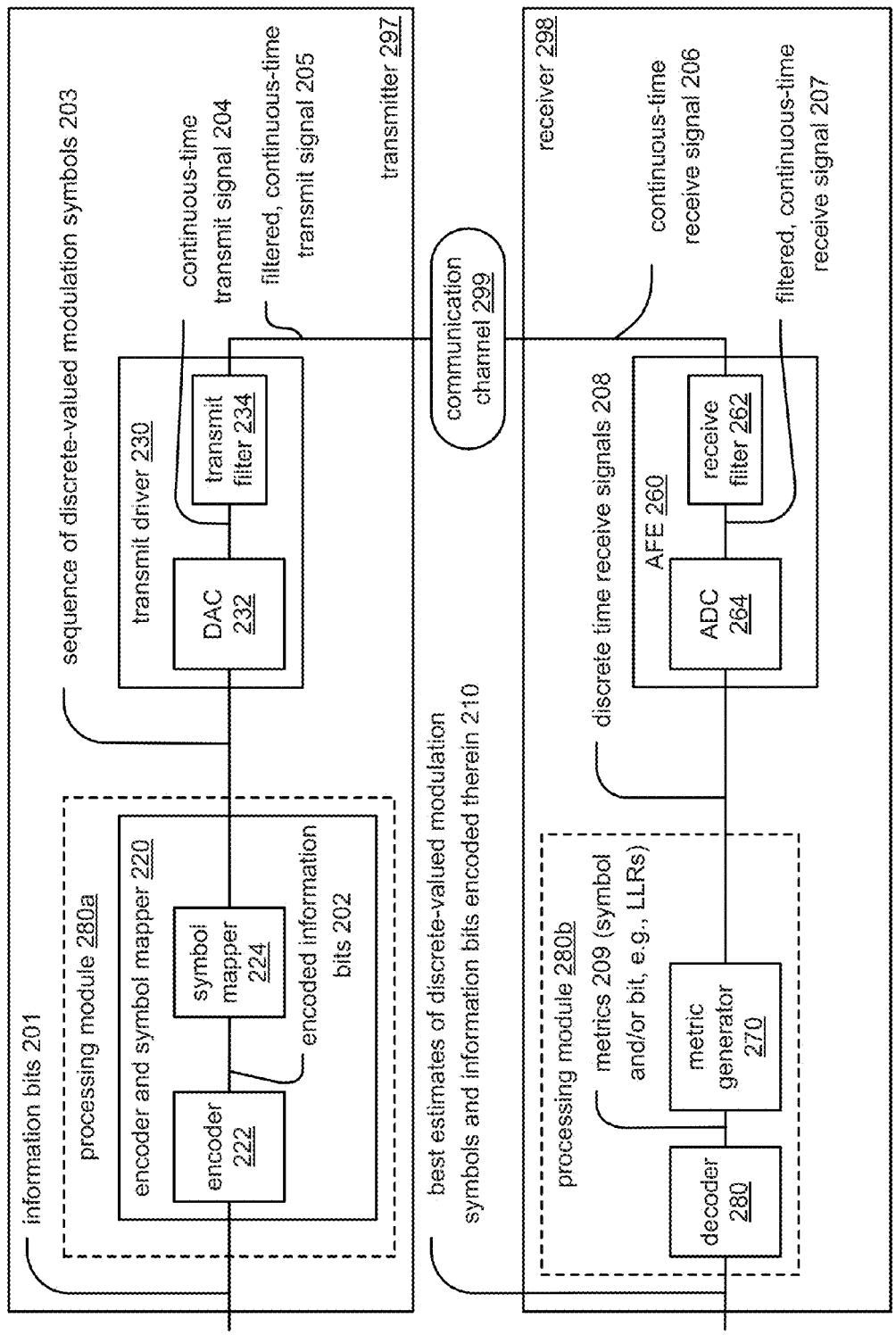

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280*a* as including the encoder and symbol mapper 220 and all associated, corresponding components therein, and a processing module 280 is shown as including the metric generator 270 and the decoder 280 and all associated, corresponding components therein. Such processing modules 280*a* and 280*b* may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Digital image and/or video processing of digital images and/or media (including the respective images within a digital video signal) may be performed by any of the various devices depicted below in FIG. 3A-3H to allow a user to view such digital images and/or video. These various devices do not include an exhaustive list of devices in which the image and/or video processing described herein may be effectuated, and it is noted that any generic digital image and/or video processing device may be implemented to perform the processing described herein without departing from the scope and spirit of the invention.

Figure 3:
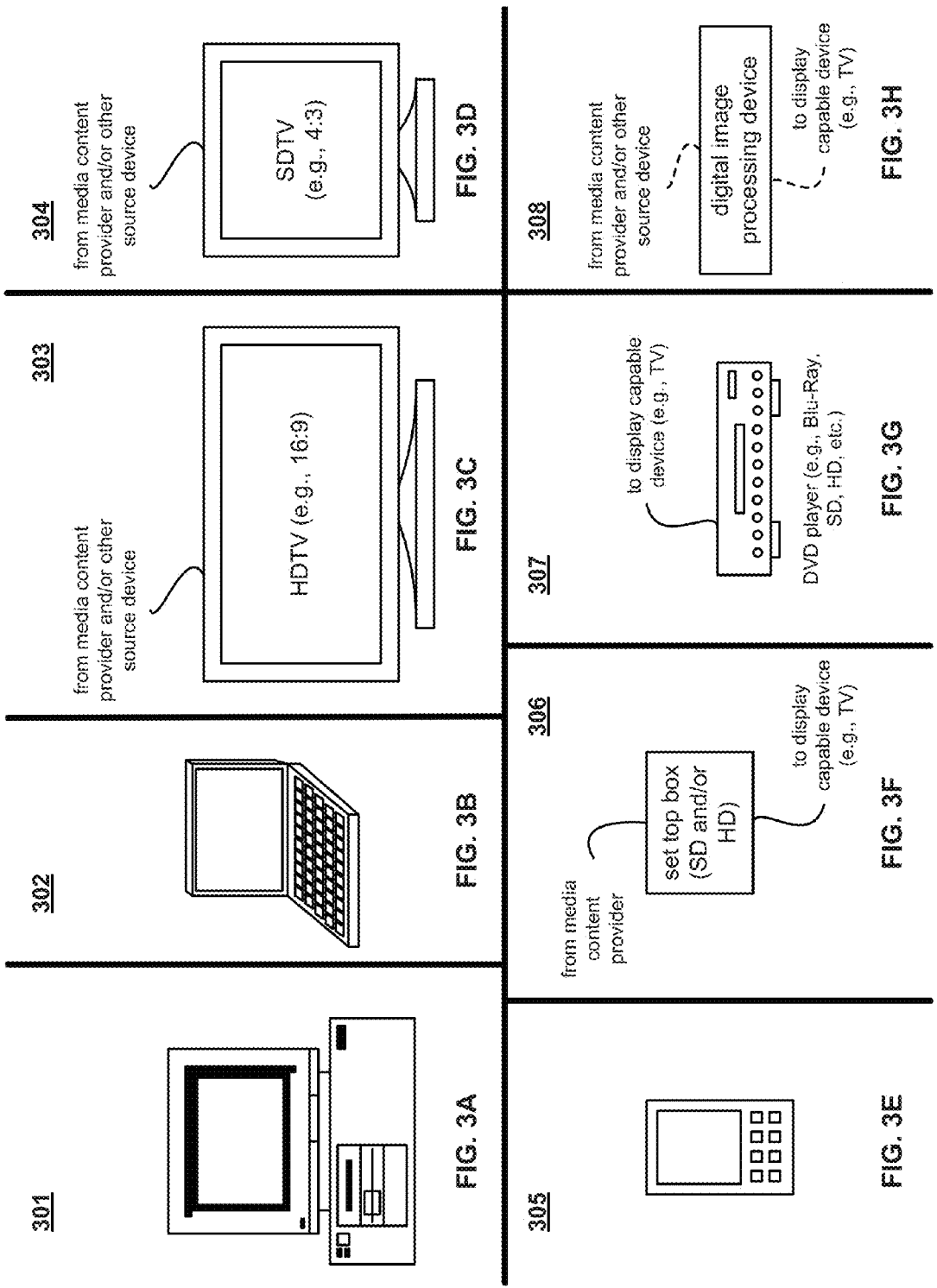
FIG. 3A illustrates an embodiment of a computer.
FIG. 3B illustrates an embodiment of a laptop computer.
FIG. 3C illustrates an embodiment of a high definition (HD) television.
FIG. 3D illustrates an embodiment of a standard definition (SD) television.
FIG. 3E illustrates an embodiment of a handheld media unit.
FIG. 3F illustrates an embodiment of a set top box (STB).
FIG. 3G illustrates an embodiment of a digital video disc (DVD) player.
FIG. 3H illustrates an embodiment of a generic digital image and/or video processing device.

FIG. 3A illustrates an embodiment of a computer 301. The computer 301 can be a desktop computer, or an enterprise storage devices such a server, of a host computer that is attached to a storage array such as a redundant array of independent disks (RAID) array, storage router, edge router, storage switch and/or storage director. A user is able to view still digital images and/or video (e.g., a sequence of digital images) using the computer 301. Oftentimes, various image and/or video viewing programs and/or media player programs are included on a computer 301 to allow a user to view such images (including video).

FIG. 3B illustrates an embodiment of a laptop computer 302. Such a laptop computer 302 may be found and used in any of a wide variety of contexts. In recent years, with the ever-increasing processing capability and functionality found within laptop computers, they are being employed in many instances where previously higher-end and more capable desktop computers would be used. As with the computer 301, the laptop computer 302 may include various image viewing programs and/or media player programs to allow a user to view such images (including video).

FIG. 3C illustrates an embodiment of a high definition (HD) television 303. Many HD televisions 303 include an integrated tuner to allow the receipt, processing, and decoding of media content (e.g., television broadcast signals) thereon. Alternatively, sometimes an HD television 303 receives media content from another source such as a digital video disc (DVD) player, set top box (STB) that receives, processes, and decodes a cable and/or satellite television broadcast signal. Regardless of the particular implementation, the HD television 303 may be implemented to perform image and/or video processing as described herein. Generally speaking, an HD television 303 has capability to display HD media content and oftentimes is implemented having a 16:9 widescreen aspect ratio.

FIG. 3D illustrates an embodiment of a standard definition (SD) television 304. Of course, an SD television 304 is somewhat analogous to an HD television 303, with at least one difference being that the SD television 304 does not include capability to display HD media content, and an SD television 304 oftentimes is implemented having a 4:3 full screen aspect ratio. Nonetheless, even an SD television 304 may be implemented to perform image and/or video processing as described herein.

FIG. 3E illustrates an embodiment of a handheld media unit 305. A handheld media unit 305 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 305 may be employed for storage and playback of virtual any media (e.g., audio media, video media, photographic media, etc.). Moreover, such a handheld media unit 305 may also include other functionality such as integrated communication circuitry for wired and wireless communications. Such a handheld media unit 305 may be implemented to perform image and/or video processing as described herein.

FIG. 3F illustrates an embodiment of a set top box (STB) 306. As mentioned above, sometimes a STB 306 may be implemented to receive, process, and decode a cable and/or satellite television broadcast signal to be provided to any appropriate display capable device such as SD television 304 and/or HD television 303. Such an STB 306 may operate independently or cooperatively with such a display capable device to perform image and/or video processing as described herein.

FIG. 3G illustrates an embodiment of a digital video disc (DVD) player 307. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 304 and/or HD television 303. The DVD player 305 may be implemented to perform image and/or video processing as described herein.

FIG. 3H illustrates an embodiment of a generic digital image and/or video processing device 308. Again, as mentioned above, these various devices described above do not include an exhaustive list of devices in which the image and/or video processing described herein may be effectuated, and it is noted that any generic digital image and/or video processing device 308 may be implemented to perform the image and/or video processing described herein without departing from the scope and spirit of the invention.

Figure 4:
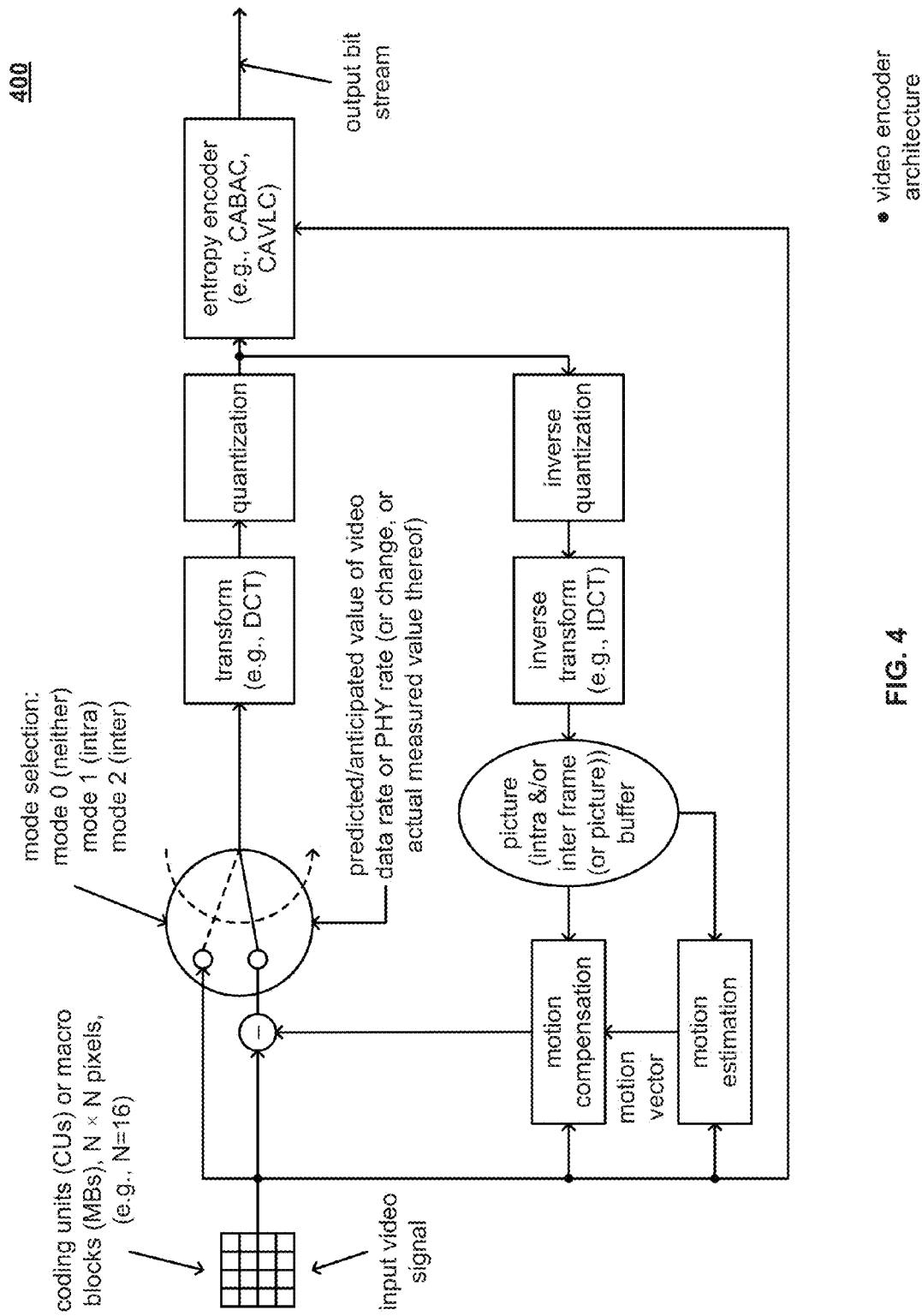
FIG. 4, FIG. 5, and FIG. 6 are diagrams illustrating various embodiments of video encoding architectures.
Figure 5:
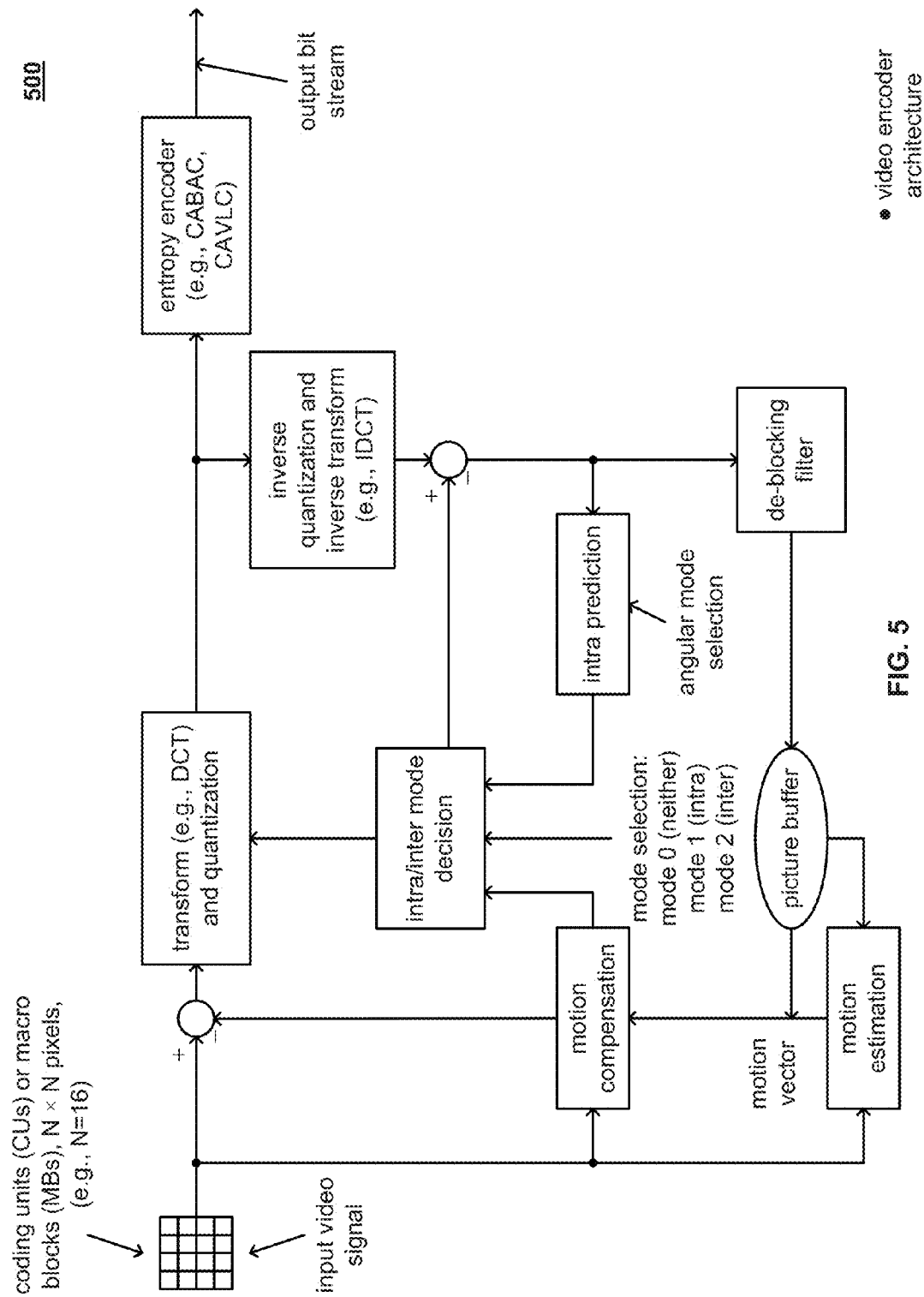
Figure 6:
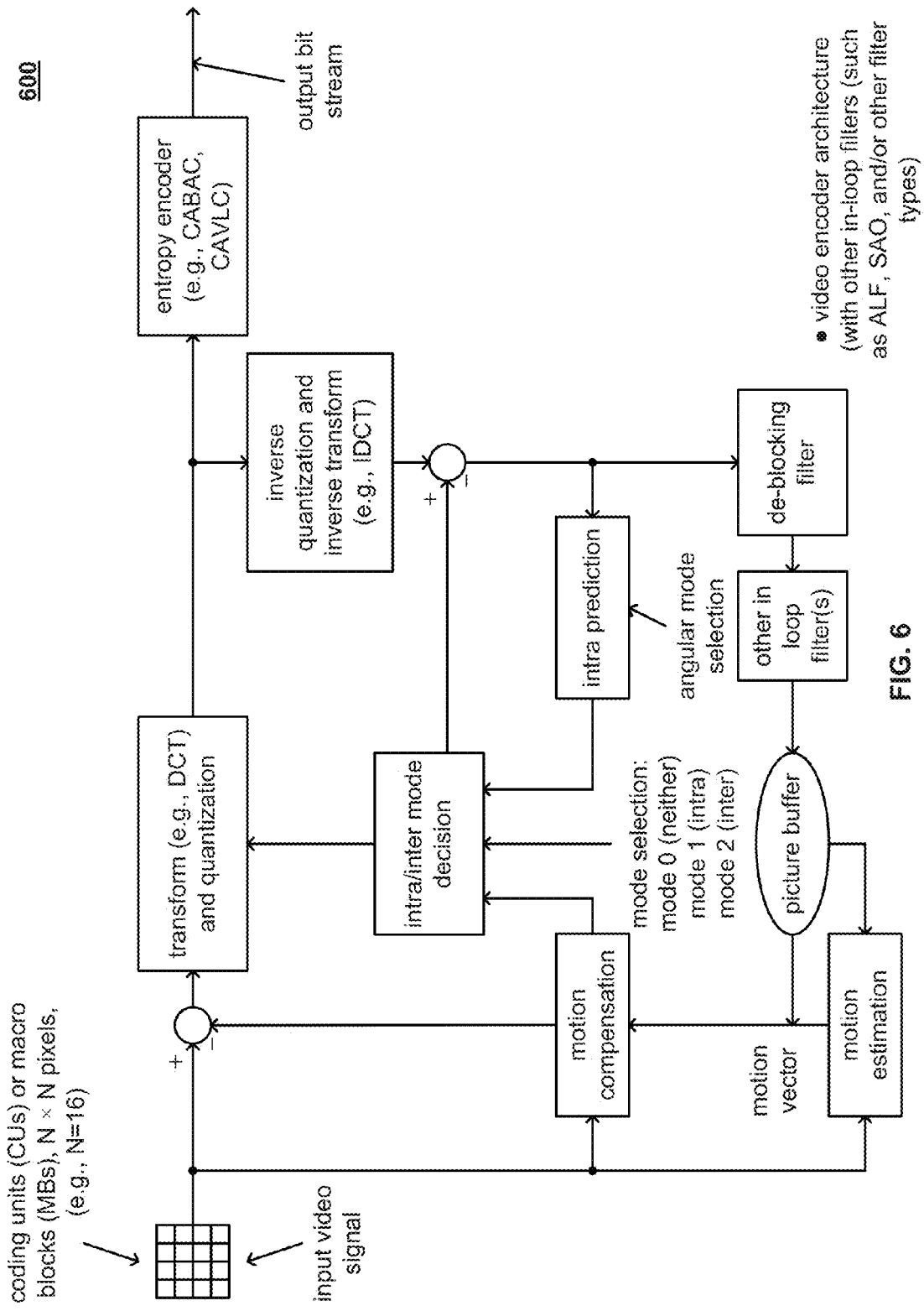

FIG. 4, FIG. 5, and FIG. 6 are diagrams illustrating various embodiments 400 and 500, and 600, respectively, of video encoding architectures.

Referring to embodiment 400 of FIG. 4, as may be seen with respect to this diagram, an input video signal is received by a video encoder. In certain embodiments, the input video signal is composed of coding units (CUs) or macro-blocks (MBs). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer, alternatively referred to as a digital picture buffer or a DPB, receives the signal from the IDCT module; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 500 of FIG. 5, as may be seen with respect to this diagram, an input video signal is received by a video encoder. In certain embodiments, the input video signal is composed of coding units or macro-blocks (and/or may be partitioned into coding units (CUs)). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

An adaptive loop filter (ALF) is implemented to process the output from the inverse transform block. Such an adaptive loop filter (ALF) is applied to the decoded picture before it is stored in a picture buffer (sometimes referred to as a DPB, digital picture buffer). The adaptive loop filter (ALF) is implemented to reduce coding noise of the decoded picture, and the filtering thereof may be selectively applied on a slice by slice basis, respectively, for luminance and chrominance whether or not the adaptive loop filter (ALF) is applied either at slice level or at block level. Two-dimensional 2-D finite impulse response (FIR) filtering may be used in application of the adaptive loop filter (ALF). The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment operates by generating the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an adaptive loop filter (ALF), there may be some increasing complexity within encoder implemented within the transmitter communication device as well as within a decoder implemented within a receiver communication device.

In certain optional embodiments, the output from the deblocking filter is provided to one or more other in-loop filters (e.g., implemented in accordance with adaptive loop filter (ALF), sample adaptive offset (SAO) filter, and/or any other filter type) implemented to process the output from the inverse transform block. For example, such an ALF is applied to the decoded picture before it is stored in a picture buffer (again, sometimes alternatively referred to as a DPB, digital picture buffer). Such an ALF is implemented to reduce coding noise of the decoded picture, and the filtering thereof may be selectively applied on a slice by slice basis, respectively, for luminance and chrominance whether or not such an ALF is applied either at slice level or at block level. Two-dimensional 2-D finite impulse response (FIR) filtering may be used in application of such an ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment is operative to generate the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with ALF processing.

With respect to one type of an in-loop filter, the use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with adaptive loop filter (ALF) processing.

Receiving the signal output from the ALF is a picture buffer, alternatively referred to as a digital picture buffer or a DPB; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 600 of FIG. 6, with respect to this diagram depicting an alternative embodiment of a video encoder, such a video encoder carries out prediction, transform, and encoding processes to produce a compressed output bit stream. Such a video encoder may operate in accordance with and be compliant with one or more video encoding protocols, standards, and/or recommended practices such as ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

As may be seen with respect to this diagram, alternative arrangements and architectures may be employed for effectuating video encoding. Generally speaking, an encoder processes an input video signal (e.g., typically composed in units of coding units or macro-blocks, often times being square in shape and including N×N pixels therein). The video encoding determines a prediction of the current macro-block based on previously coded data. That previously coded data may come from the current frame (or picture) itself (e.g., such as in accordance with intra-prediction) or from one or more other frames (or pictures) that have already been coded (e.g., such as in accordance with inter-prediction). The video encoder subtracts the prediction of the current macro-block to form a residual.

Generally speaking, intra-prediction is operative to employ block sizes of one or more particular sizes (e.g., 16×16, 8×8, or 4×4) to predict a current macro-block from surrounding, previously coded pixels within the same frame (or picture). Generally speaking, inter-prediction is operative to employ a range of block sizes (e.g., 16×16 down to 4×4) to predict pixels in the current frame (or picture) from regions that are selected from within one or more previously coded frames (or pictures).

With respect to the transform and quantization operations, a block of residual samples may undergo transformation using a particular transform (e.g., 4×4 or 8×8). One possible embodiment of such a transform operates in accordance with discrete cosine transform (DCT). The transform operation outputs a group of coefficients such that each respective coefficient corresponds to a respective weighting value of one or more basis functions associated with a transform. After undergoing transformation, a block of transform coefficients is quantized (e.g., each respective coefficient may be divided by an integer value and any associated remainder may be discarded, or they may be multiplied by an integer value). The quantization process is generally inherently lossy, and it can reduce the precision of the transform coefficients according to a quantization parameter (QP). Typically, many of the coefficients associated with a given macro-block are zero, and only some non-zero coefficients remain. Generally, a relatively high QP setting is operative to result in a greater proportion of zero-valued coefficients and smaller magnitudes of non-zero coefficients, resulting in relatively high compression (e.g., relatively lower coded bit rate) at the expense of relatively poorly decoded image quality; a relatively low QP setting is operative to allow more non-zero coefficients to remain after quantization and larger magnitudes of non-zero coefficients, resulting in relatively lower compression (e.g., relatively higher coded bit rate) with relatively better decoded image quality.

The video encoding process produces a number of values that are encoded to form the compressed bit stream. Examples of such values include the quantized transform coefficients, information to be employed by a decoder to re-create the appropriate prediction, information regarding the structure of the compressed data and compression tools employed during encoding, information regarding a complete video sequence, etc. Such values and/or parameters (e.g., syntax elements) may undergo encoding within an entropy encoder operating in accordance with CABAC, CAVLC, or some other entropy coding scheme, to produce an output bit stream that may be stored, transmitted (e.g., after undergoing appropriate processing to generate a continuous time signal that comports with a communication channel), etc.

In an embodiment operating using a feedback path, the output of the transform and quantization undergoes inverse quantization and inverse transform. One or both of intra-prediction and inter-prediction may be performed in accordance with video encoding. Also, motion compensation and/or motion estimation may be performed in accordance with such video encoding.

The signal path output from the inverse quantization and inverse transform (e.g., IDCT) block, which is provided to the intra-prediction block, is also provided to a de-blocking filter. The output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, in one possible embodiment, an ALF is applied to the decoded picture before it is stored in a picture buffer (again, sometimes alternatively referred to as a DPB, digital picture buffer). The ALF is implemented to reduce coding noise of the decoded picture, and the filtering thereof may be selectively applied on a slice by slice basis, respectively, for luminance and chrominance whether or not the ALF is applied either at slice level or at block level. Two-dimensional 2-D finite impulse response (FIR) filtering may be used in application of the ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment generated the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with ALF processing.

With respect to any video encoder architecture implemented to generate an output bitstream, it is noted that such architectures may be implemented within any of a variety of communication devices. The output bitstream may undergo additional processing including error correction code (ECC), forward error correction (FEC), etc. thereby generating a modified output bitstream having additional redundancy deal therein. Also, as may be understood with respect to such a digital signal, it may undergo any appropriate processing in accordance with generating a continuous time signal suitable for or appropriate for transmission via a communication channel. That is to say, such a video encoder architecture may be implemented within a communication device operative to perform transmission of one or more signals via one or more communication channels. Additional processing may be made on an output bitstream generated by such a video encoder architecture thereby generating a continuous time signal that may be launched into a communication channel.

Figure 7:
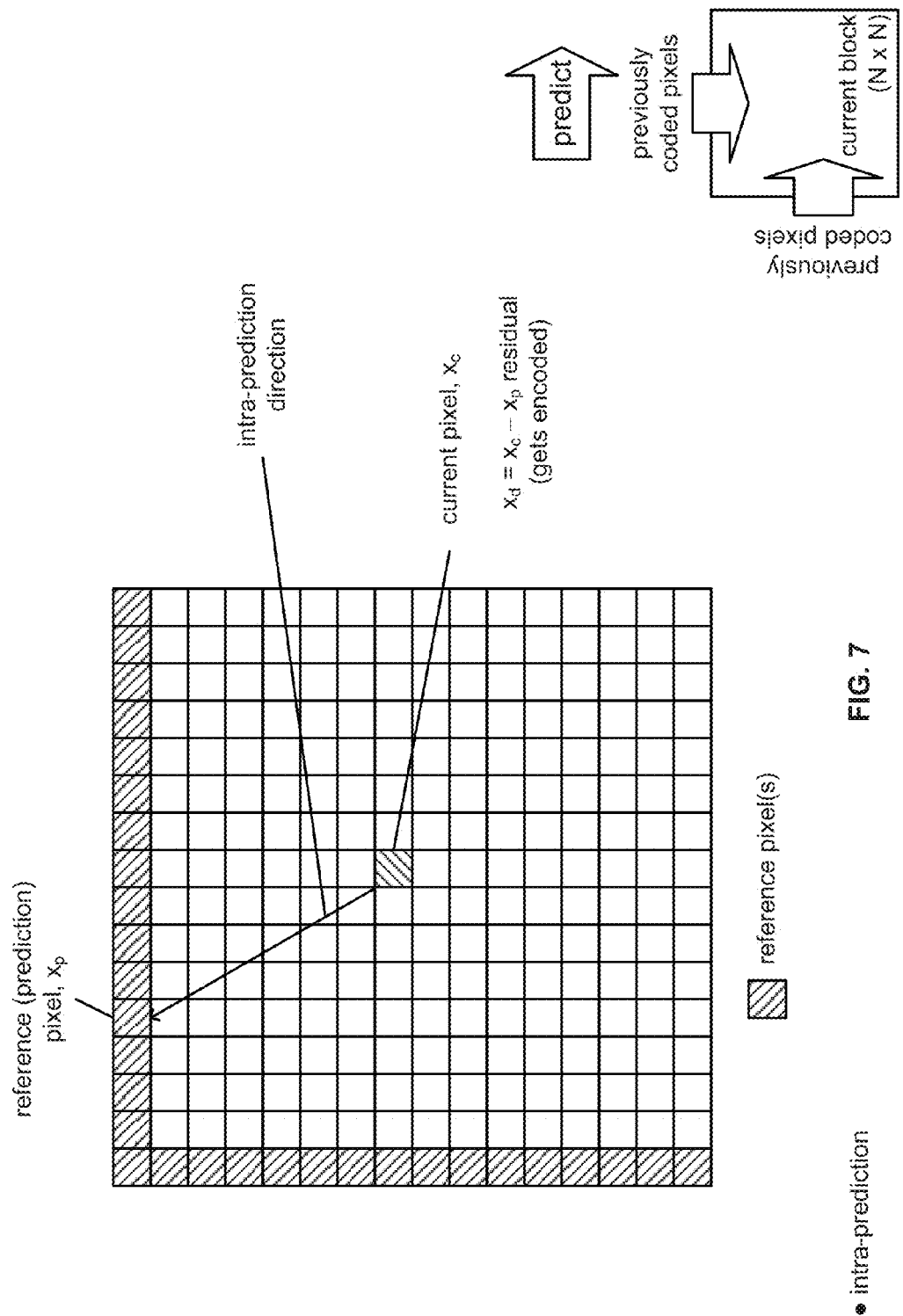
FIG. 7 is a diagram illustrating an embodiment of intra-prediction processing.

FIG. 7 is a diagram illustrating an embodiment 700 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELECOMMUNICATION STANDARDIZATION SECTOR OF ITU, H.264 (March/2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 8:
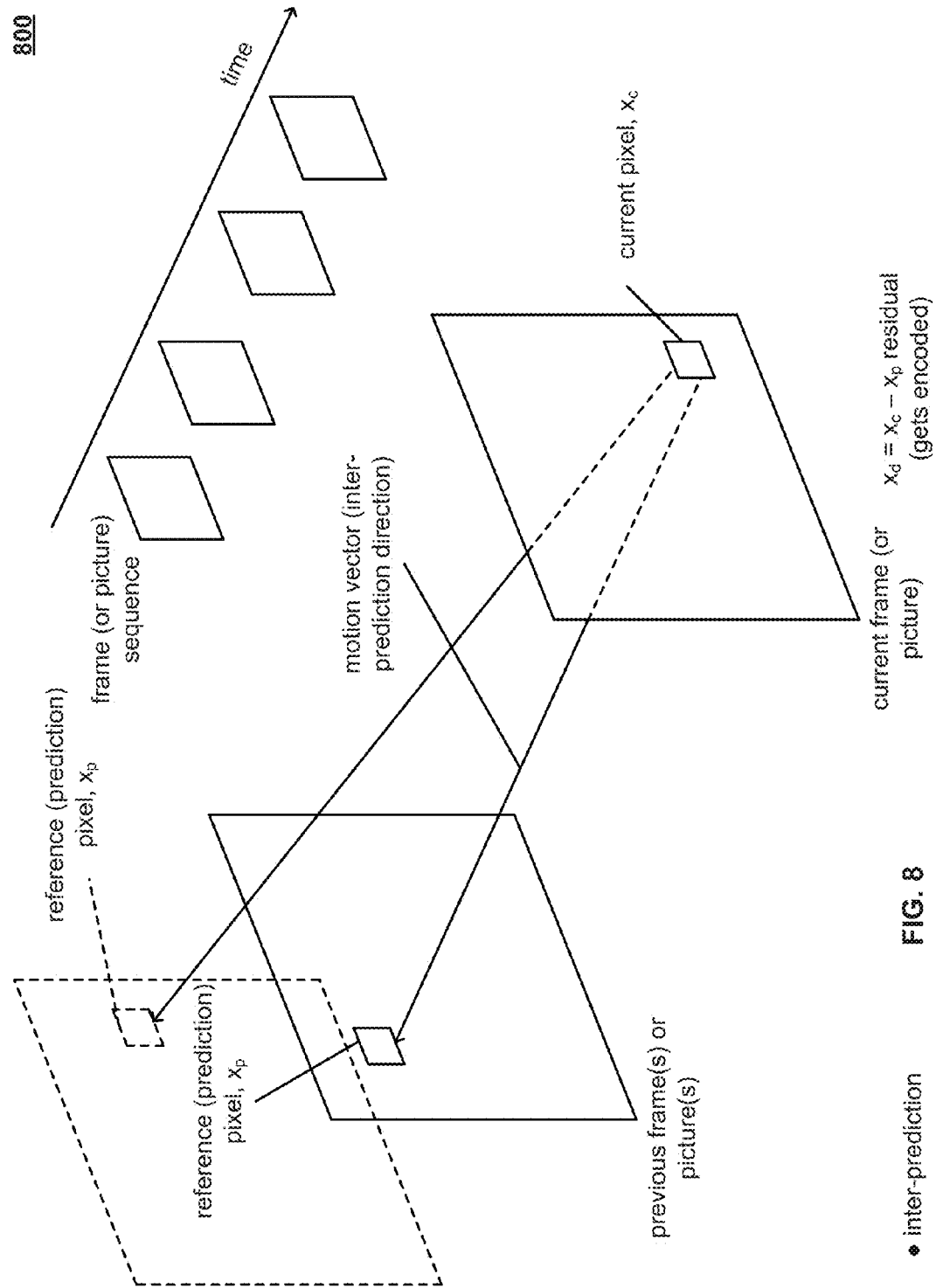
FIG. 8 is a diagram illustrating an embodiment of inter-prediction processing.

FIG. 8 is a diagram illustrating an embodiment 800 of inter-prediction processing. In contradistinction to intra-prediction, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture). While this diagram shows inter-prediction as being employed with respect to one or more previous frames or pictures, it is also noted that alternative embodiments may operate using references corresponding to frames before and/or after a current frame. For example, in accordance with appropriate buffering and/or memory management, a number of frames may be stored. When operating on a given frame, references may be generated from other frames that precede and/or follow that given frame.

Coupled with the CU, a basic unit may be employed for the prediction partition mode, namely, the prediction unit, or PU. It is also noted that the PU is defined only for the last depth CU, and its respective size is limited to that of the CU.

Figure 9:
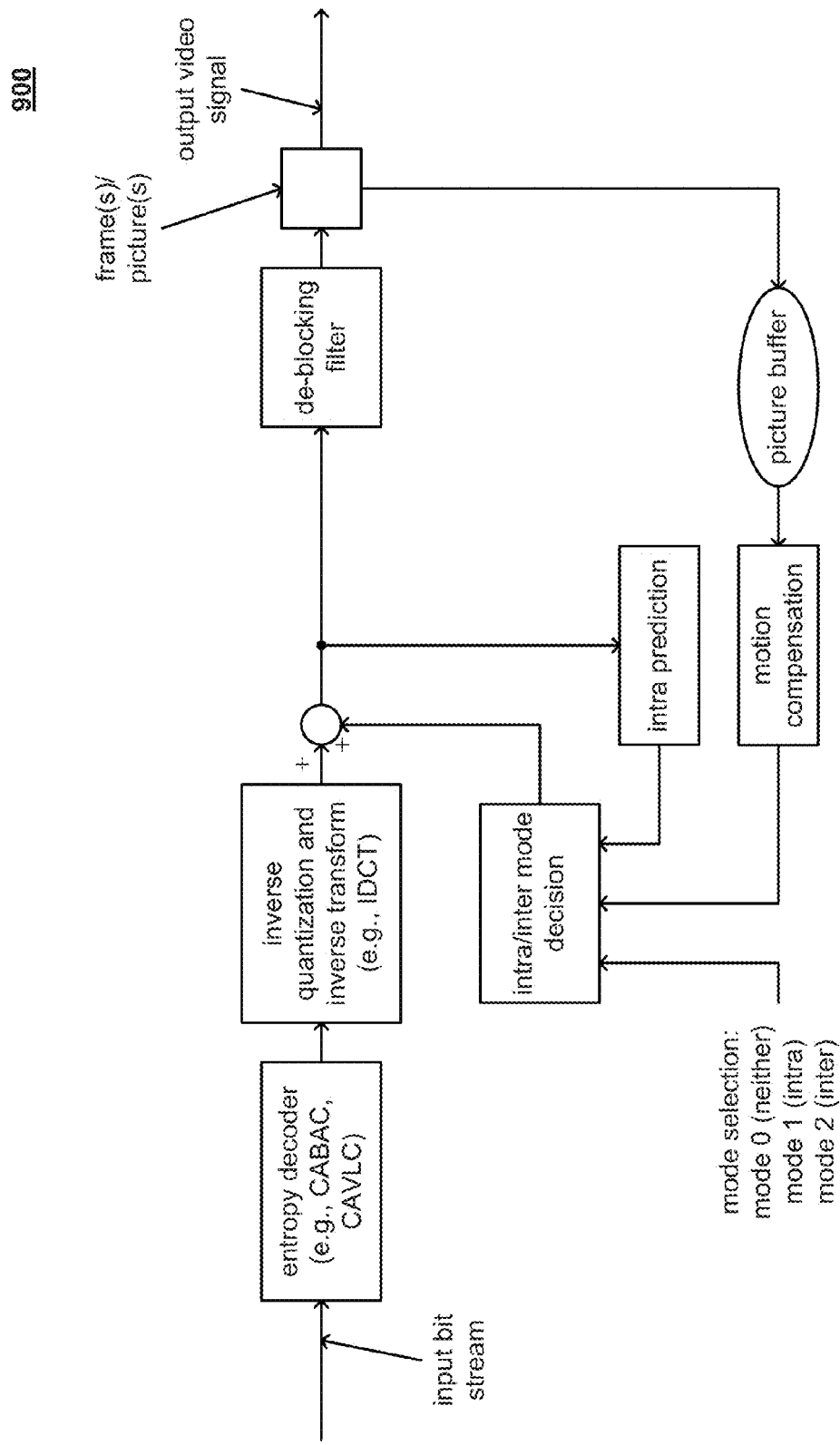
FIG. 9 and FIG. 10 are diagrams illustrating various embodiments of video decoding architectures.
Figure 10:
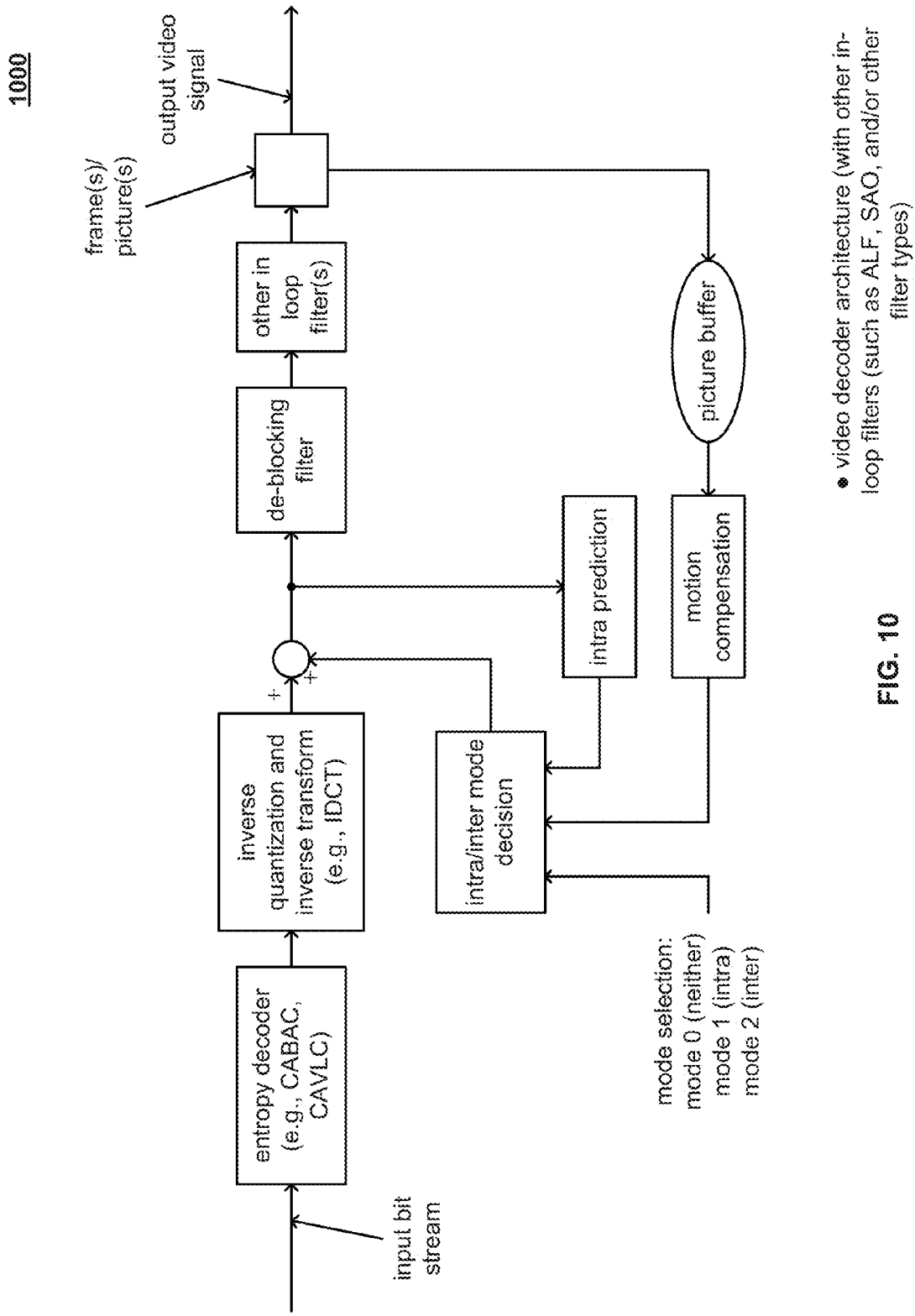

FIG. 9 and FIG. 10 are diagrams illustrating various embodiments 900 and 1000, respectively, of video decoding architectures.

Generally speaking, such video decoding architectures operate on an input bitstream. It is of course noted that such an input bitstream may be generated from a signal that is received by a communication device from a communication channel. Various operations may be performed on a continuous time signal received from the communication channel, including digital sampling, demodulation, scaling, filtering, etc. such as may be appropriate in accordance with generating the input bitstream. Moreover, certain embodiments, in which one or more types of error correction code (ECC), forward error correction (FEC), etc. may be implemented, may perform appropriate decoding in accordance with such ECC, FEC, etc. thereby generating the input bitstream. That is to say, in certain embodiments in which additional redundancy may have been made in accordance with generating a corresponding output bitstream (e.g., such as may be launched from a transmitter communication device or from the transmitter portion of a transceiver communication device), appropriate processing may be performed in accordance with generating the input bitstream. Overall, such a video decoding architectures and lamented to process the input bitstream thereby generating an output video signal corresponding to the original input video signal, as closely as possible and perfectly in an ideal case, for use in being output to one or more video display capable devices.

Referring to the embodiment 900 of FIG. 9, generally speaking, a decoder such as an entropy decoder (e.g., which may be implemented in accordance with CABAC, CAVLC, etc.) processes the input bitstream in accordance with performing the complementary process of encoding as performed within a video encoder architecture. The input bitstream may be viewed as being, as closely as possible and perfectly in an ideal case, the compressed output bitstream generated by a video encoder architecture. Of course, in a real-life application, it is possible that some errors may have been incurred in a signal transmitted via one or more communication links. The entropy decoder processes the input bitstream and extracts the appropriate coefficients, such as the DCT coefficients (e.g., such as representing chroma, luma, etc. information) and provides such coefficients to an inverse quantization and inverse transform block. In the event that a DCT transform is employed, the inverse quantization and inverse transform block may be implemented to perform an inverse DCT (IDCT) operation. Subsequently, A/D blocking filter is implemented to generate the respective frames and/or pictures corresponding to an output video signal. These frames and/or pictures may be provided into a picture buffer, or a digital picture buffer (DPB) for use in performing other operations including motion compensation. Generally speaking, such motion compensation operations may be viewed as corresponding to inter-prediction associated with video encoding. Also, intra-prediction may also be performed on the signal output from the inverse quantization and inverse transform block. Analogously as with respect to video encoding, such a video decoder architecture may be implemented to perform mode selection between performing it neither intra-prediction nor inter-prediction, inter-prediction, or intra-prediction in accordance with decoding an input bitstream thereby generating an output video signal.

Referring to the embodiment 1000 of FIG. 10, in certain optional embodiments, one or more in-loop filters (e.g., implemented in accordance with adaptive loop filter (ALF), sample adaptive offset (SAO) filter, and/or any other filter type) such as may be implemented in accordance with video encoding as employed to generate an output bitstream, a corresponding one or more in-loop filters may be implemented within a video decoder architecture. In one embodiment, an appropriate implementation of one or more such in-loop filters is after the de-blocking filter.

Figure 11:
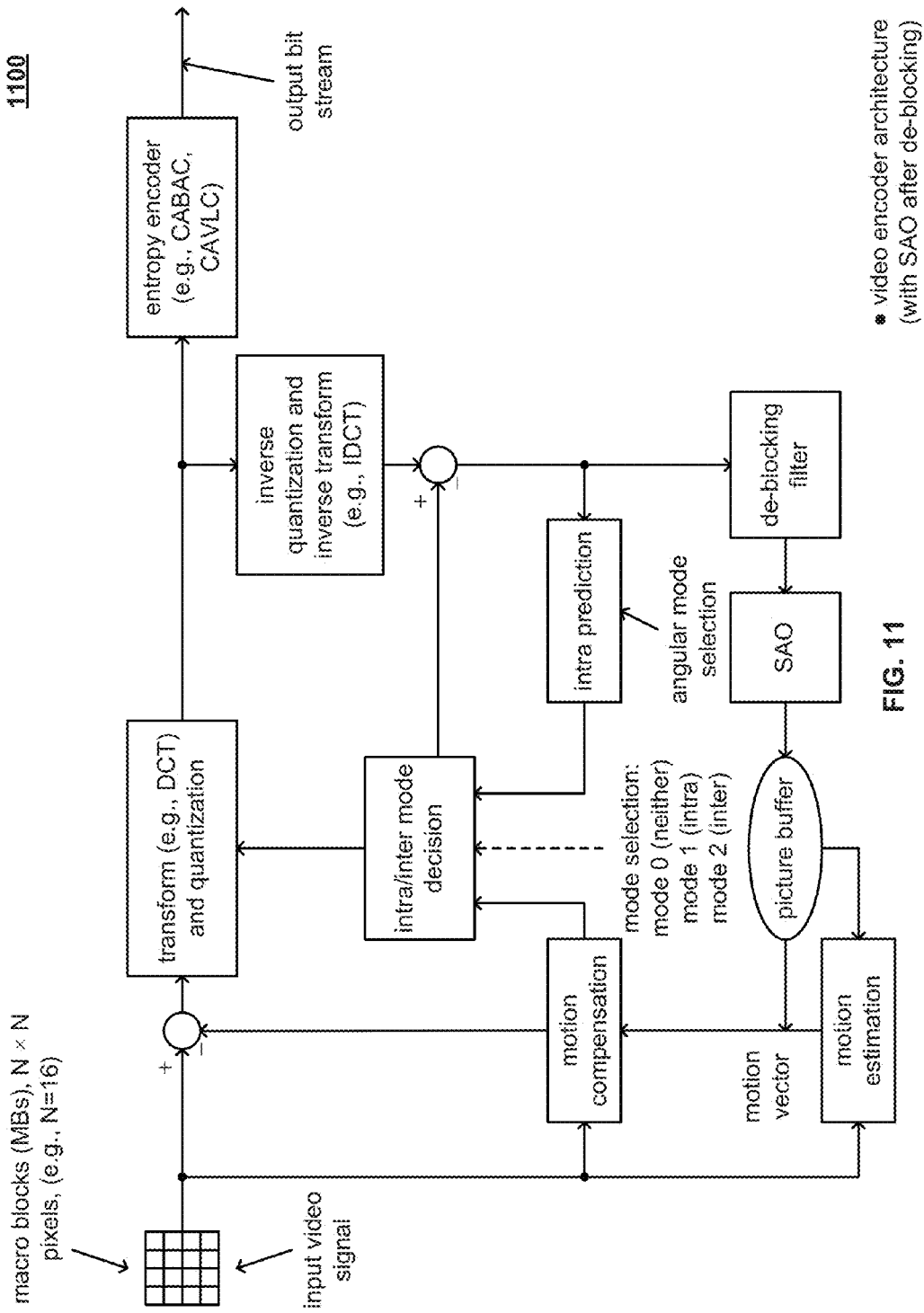
FIG. 11 illustrates an embodiment of a video encoding architecture (with sample adaptive offset (SAO) implemented after de-blocking).

FIG. 11 illustrates an embodiment 1100 of a video encoding architecture (with sample adaptive offset (SAO) implemented after de-blocking). Sample Adaptive Offset (SAO) (e.g., in accordance with a current adoption in HEVC) may be employed for reducing any existent distortion between original pictures and reconstructed pictures caused by quantization. However, in accordance with such a proposal of SAO, such SAO operations are performed after de-quantization and inverse transform (e.g., in accordance with FIG. 11), which is not a very efficient implementation.

Figure 12:
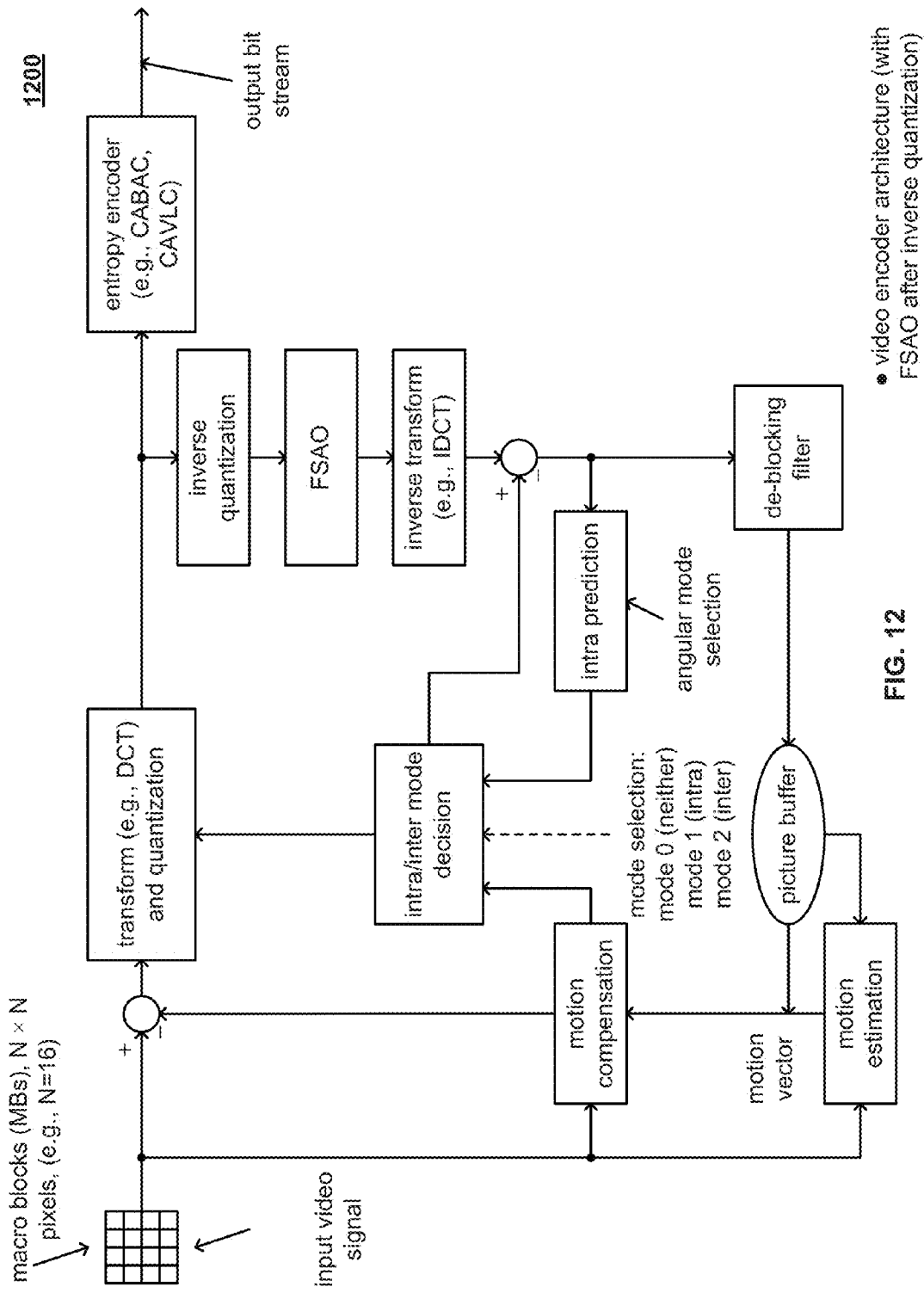
FIG. 12 illustrates an embodiment of a video encoding architecture (with a frequency-domain sample adaptive offset (FSAO) implemented after inverse quantization).

FIG. 12 illustrates an embodiment 1200 of a video encoding architecture (with a frequency-domain sample adaptive offset (FSAO) implemented after inverse quantization). Herein, a novel implementation is proposed by which frequency domain SAO (FSAO) is implemented and may be carried out immediately after dequantization (e.g., in accordance with FIG. 12). A frequency-domain implemented SAO (FSAO) is relatively much more accurate since it avoids any possible distribution caused by inverse transform.

As may be seen within this diagram, a frequency-domain implemented sample adaptive offset (FSAO) is instead implemented after inverse quantization and before inverse transform in this alternative embodiment of a video encoder architecture.

With respect to implementing such frequency domain operations, spectral band replication (SBR) may be performed with respect to the video information of a received signal. For example, with respect to a received input bitstream (such as a video signal), a majority of energy or information included within that received input bitstream may be below a certain frequency. For example, in accordance with performing video encoding, particularly with respect to the trans-forming quantization operations performed, at least in part, in generating an output bitstream from an input video signal (e.g. which may be represented as CUs, MBs, etc.), any energy or information above a particular frequency is generally lost in accordance with compression processing. That is to say, relatively high frequency energy or information included within the input video signal is generally lost in accordance with video compression (e.g., such as in accordance with transforming from the time domain to the frequency domain).

As such, and output bitstream, such as generated by a video encoder, will typically not include a great deal of energy or information above a certain frequency (e.g., a cutoff frequency, $f_c$, corresponding to that frequency above which energy or information is lost in accordance with compression processing). As such, an output bitstream may not include all high-frequency energy or information therein. As such, in input bitstream received by a video decoder, when reconstructing or generating an output video signal there from, will not have access to such high-frequency energy or information. For example, when transmitting a video signal from a transmitter device to a receiver device (e.g., which may include any appropriate processing to generate a signal that comports with the communication channel, transmitting the communication channel compliance signal from the transmitter device to the receiver device, and receiving the transmitted signal from the communication channel at the receiver device, etc.), such a receiver device will not have access to all high-frequency energy or information that may have been contained within an original or prior input video signal.

However, in accordance with performing video decoding, such a device may be implemented nonetheless to reconstruct such high-frequency energy or information based upon information included within the video signal received and/or the input bitstream corresponding thereto or derived therefrom.

For example, in accordance with performing video decoding processing, all of the energy or information within the signal may be identified as being below a certain frequency (e.g., a cutoff frequency, $f_c$, corresponding to that frequency above which energy or information is lost in accordance with compression processing). In accordance with reconstructing relatively high frequency information within a video signal, spectral band replication (SBR) may be used to improve the coding efficiency of such a video signal. While many exemplary embodiments are described herein respect to video coding applications, it is also noted that such SBR may also be applied to audio signals and/or other types of signals without departing from the scope and spirit of the invention.

For example, SBR may be viewed as being based on and using harmonic redundancy in the frequency domain of energy or information associated with the signal. Again, within the context of video coding, a majority or all of the energy information will be located below a certain frequency (e.g., a cutoff frequency, $f_c$, corresponding to that frequency above which energy or information is lost in accordance with compression processing). Moreover, in the context of video coding, it is also noted that the use of such SBR may be made based upon the principle that the perceptual capabilities of the human eye and human brain as tending to analyze higher frequency information with relatively less accuracy. Analogously, with respect to audio coding, the psychoacoustic part of the human brain tends to analyze higher frequency audio information with relatively less accuracy as well. As such, harmonic phenomenon or phenomena associated with such an SBR process need only be accurate within a perceptual sense based on human perceptual capability, and it need not be technically or mathematically exact (because of the incapability of human perception to discern such high-frequency information with a high degree of accuracy).

Figure 13:
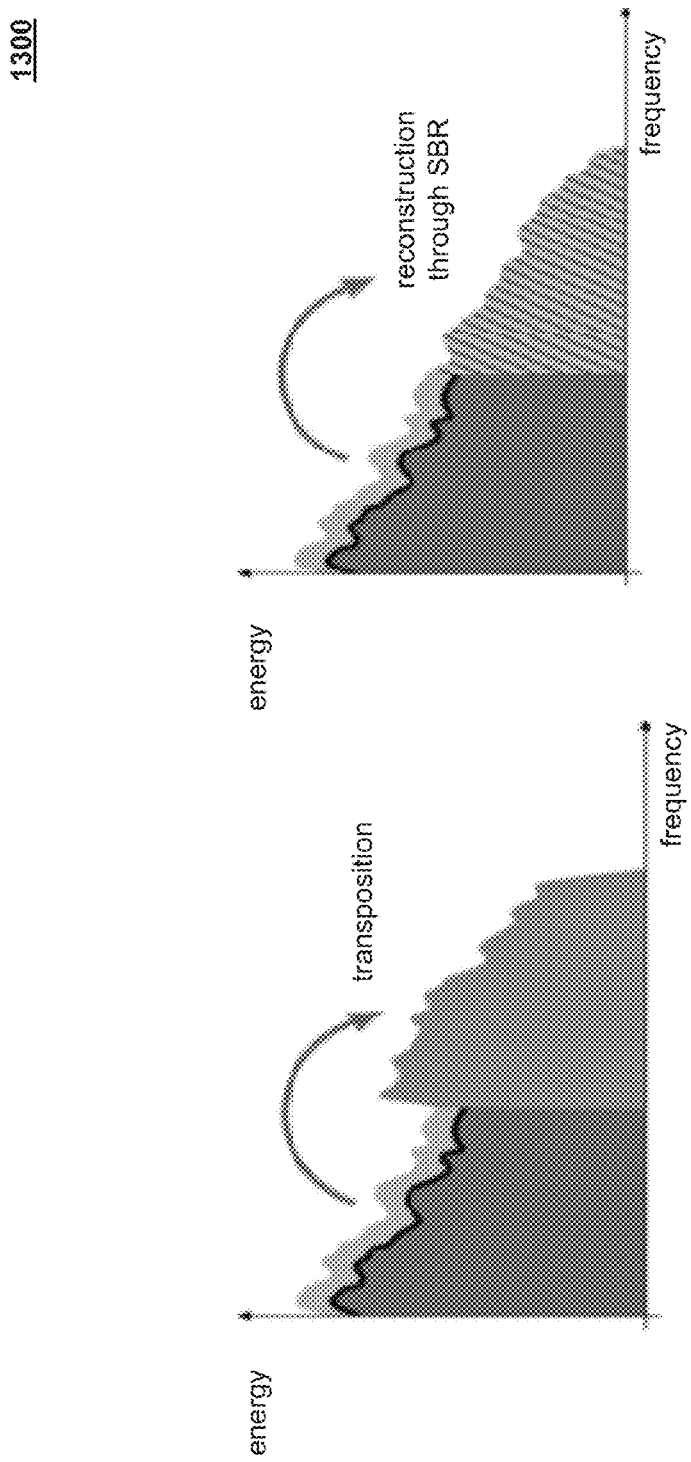
FIG. 13 illustrates an embodiment of principles of spectral band replication (SBR)—transposition (a) and reconstruction (b).

FIG. 13 illustrates an embodiment 1300 of principles of spectral band replication (SBR)—transposition (a) and reconstruction (b). With respect to this diagram it can be seen on the left-hand side of the diagram that a relatively lower frequency portion of energy or information may undergo transposition or replication to a higher frequency portion of the frequency spectrum. On the right-hand side of the diagram, that replicated energy or information may further undergo appropriate scaling (e.g., shown as downward scaling or attenuation in this embodiment) to effectuate a relatively smooth transition between the original energy or information that had undergone transposition replication and the replicated and scaled energy or information. From certain perspectives, an energy profile (e.g., energy as a function of frequency) corresponding to at least one portion of a video signal undergoes replication (or replication and scaling) to generate another portion of the video signal (e.g., such as within a different frequency spectral portion). While many of the embodiments described herein include replication (or replication and scaling) from a relatively lower frequency portion to a relatively higher frequency portion. Of course, such replication (or replication and scaling) may alternatively be performed from a relatively higher frequency portion to a relatively lower frequency portion in any alternative embodiment.

Generally speaking, many signals typically exhibit relatively less energy or information at higher frequencies. For example, with respect to video signals, a majority of the energy or information is included at relatively lower frequencies. This is analogous with audio signals in which a majority of the energy or information is included at relatively lower frequencies. Moreover, given the perceptual limitations of the human eye, year, and/or brain, a significant amount of information that these relatively higher frequencies is typically not needed and/or does not provide a significant improvement in perceptual quality. Within this diagram as well as others, the amount of energy or information (as a function of frequency) is generally monotonically decreasing as frequency increases. However, as may be seen, there may be some instances in which there are ripples within this general trend of monotonic decrease.

Generally speaking, inside of an image (e.g., an image of a video signal) there may be a lot of edge information (e.g., relatively high-frequency information), and if analyzed in the frequency domain, the corresponding frequency spectrum ranges from DC to relatively high-frequency. Usually, the DC and relatively low frequency components have relatively higher magnitude than the higher frequency components within the total amount of energy or information of the signal.

If the high-frequency components are removed or heavily quantized (e.g., such as in accordance with transformation and quantization as performed in accordance with video encoding), and if only the relatively lower frequency and/or middle frequency portions of a signal are employed (e.g., such as transmitted within a signal from a transmitter device to receiver device), then the sharp edge information will be unfortunately smoothed out.

The use of SBR may be employed in accordance with video decoding to replicate such removed higher frequency components by transposing harmonics from the received signal (e.g., that includes relatively lower and/or middle frequency portions of the signal). As such, this relatively higher frequency information may be reconstructed in accordance of video decoding. Such SBR related processing may be performed on any of a number of bases including a CU basis, an MB basis, etc. without departing from the scope and spirit of the invention.

FIG. 14, FIG. 15, FIG. 16, and FIG. 17 illustrate various embodiments of spectral band replication (SBR).

Figure 14:
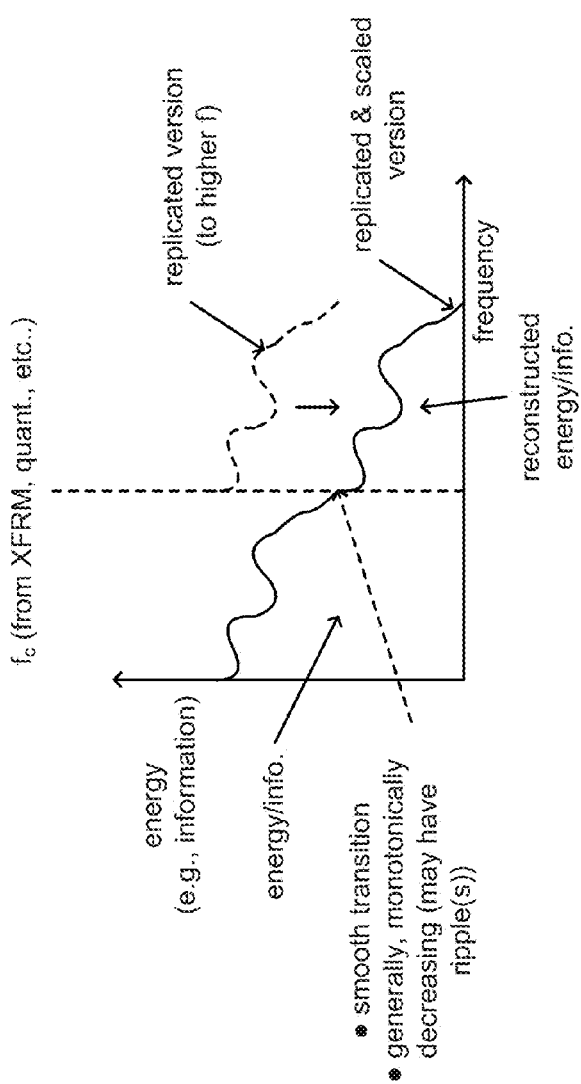
FIG. 14, FIG. 15, FIG. 16, and FIG. 17 illustrate various embodiments of spectral band replication (SBR).

Referring to embodiment 1400 of FIG. 14, as may be seen with respect to this diagram, the entirety of energy or information below a certain frequency (e.g., a cutoff frequency, $f_c$, corresponding to that frequency above which energy or information is lost in accordance with compression processing in accordance with video processing) is replicated to a higher frequency. In addition, this replicated version of the energy or information is scaled (e.g., shown as downward scaling or attenuation in this embodiment) to effectuate a relatively smooth transition between the original energy or information that had undergone transposition replication and the replicated and scaled energy or information.

Figure 15:
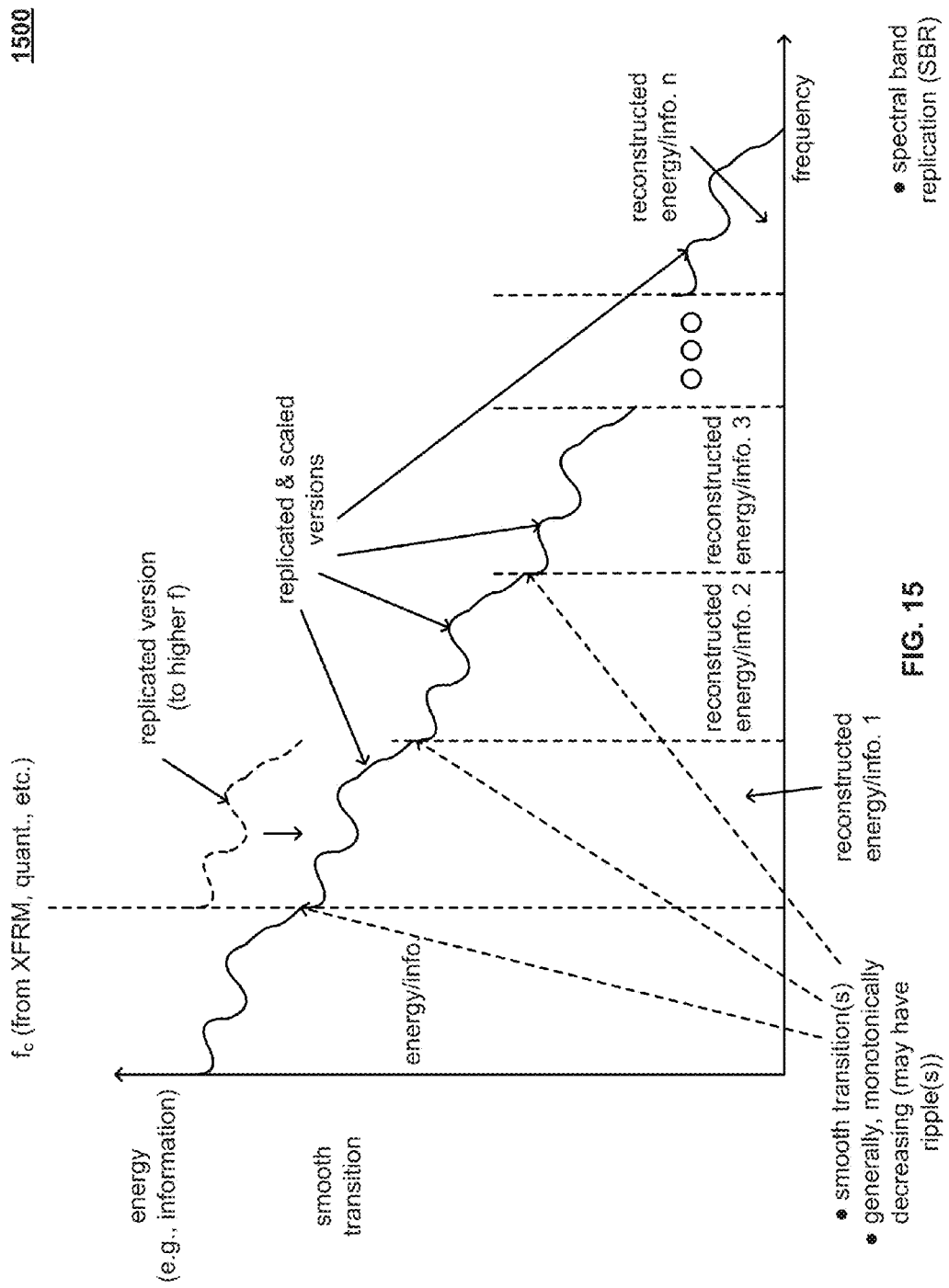

Referring to embodiment 1500 of FIG. 15, as may be seen with respect to this diagram, the entirety of energy or information below a certain frequency (e.g., a cutoff frequency, $f_c$, corresponding to that frequency above which energy or information is lost in accordance with compression processing in accordance with video processing) is replicated to a number of higher frequency bands as may be seen with respect to be constructed energy or information 1, reconstructed energy or information 2, and so on as many as may be desired in a particular embodiment.

Figure 16:
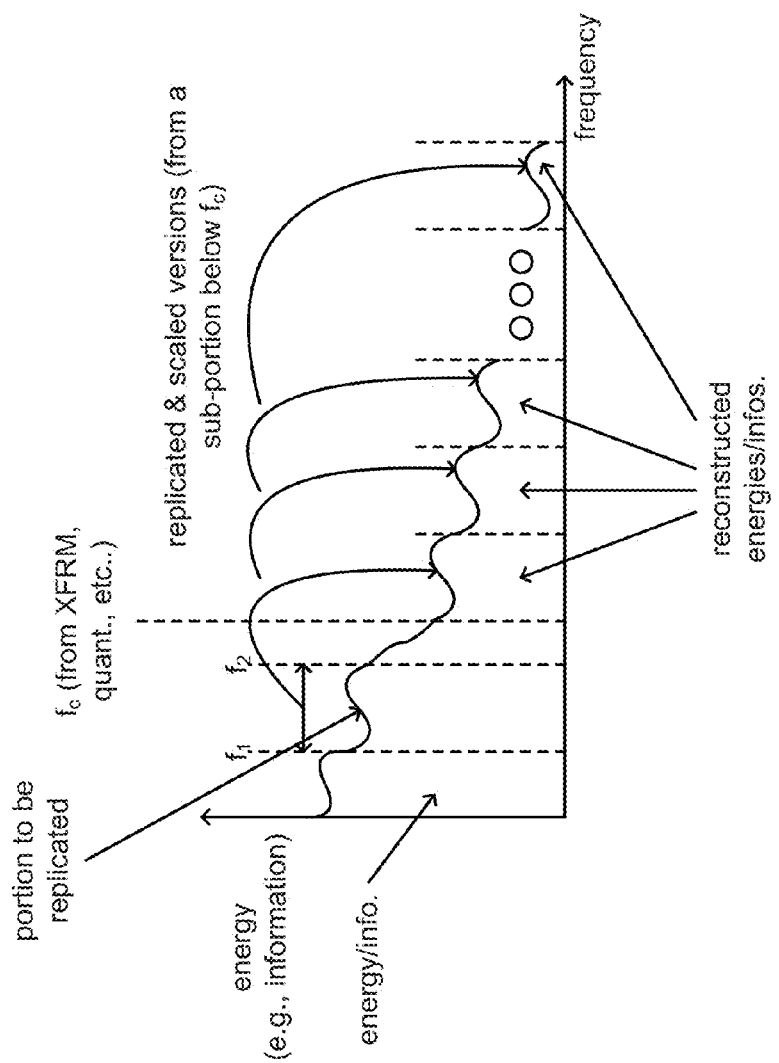

Referring to embodiment 1600 of FIG. 16, as may be seen with respect to this diagram, a portion or sub-portion of energy or information within a certain frequency band (e.g., above a first frequency, $f_1$, and below a second frequency, $f_2$) is replicated to a number (e.g., which may be one or more) of higher frequency bands. That is to say, as few as one reconstruction of this portion or sub-portion of energy or information may be replicated in one or more higher frequency spectral bands. If desired, multiple respective reconstructions of this portion or sub-portion of energy or information may be replicated in multiple respective higher frequency spectral bands.

Figure 17:
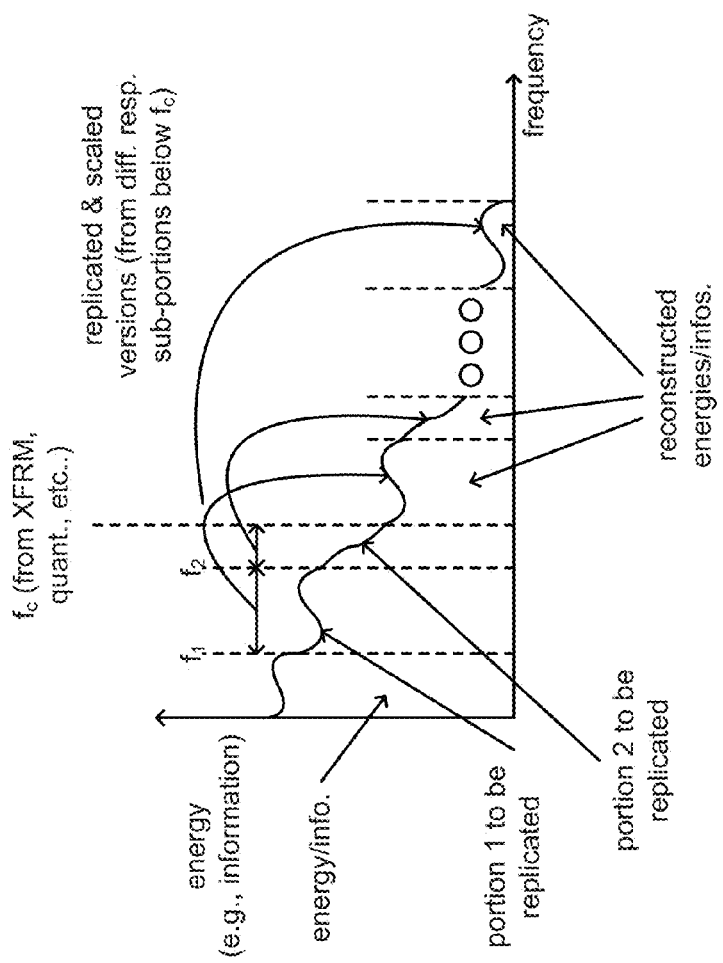

Referring to embodiment 1700 of FIG. 17, as may be seen with respect to this diagram, more than one respective portion or sub-portion of energy or information within one or more frequency bands (e.g., a first band corresponding to energy or information above a first frequency, $f_1$, and below a second frequency, $f_2$—a second band corresponding to energy or information above the second frequency, $f_2$, and below a third frequency, such as $f_c$, etc.) is replicated to a number (e.g., which may be one or more) of higher frequency bands. That is to say, as few as one respective reconstruction of each of these respective portions or sub-portions of energy or information may be replicated in one or more higher frequency spectral bands. If desired, multiple respective reconstructions of these respective portions or sub-portions of energy or information may be replicated in multiple respective higher frequency spectral bands.

If the high-frequency components are heavily quantized but not completely removed (which means some high-frequency components are remained after quantization but have large quantization distortion), they can be used as pilots during the SBR process. That is to say, the replicated high frequency bands has to be consistent with the scale and sign of the remaining high-frequency components.

Generally speaking, it is noted that any of a number of different respective portions or sub-portions of energy or information within one or more frequency bands may be used in accordance with SBR processing. For example, in accordance with video decoding, multiple respective portions or sub-portions of energy or information within one or more frequency bands may be employed in accordance with performing SBR processing thereby generating higher frequency energy or information within one or more higher frequency spectral bands.

In alternative embodiments, it is noted that coordination may be effectuated between a transmitter device and receiver device such that the transmitter device provides information to the receiver device (e.g., either within a separate control channel, or embedded within the signal transmitted that includes the video information or video signal, etc.) providing certain information to the receiver device for directing operation of the receiver device. For example, a receiver device could be configured or implemented to perform and identify any of a number of operations independently without coordination with the transmitter device (e.g., perhaps other than receiving a video signal there from). Alternatively, receiver device could be configured are implemented to receive particular information or direction from a transceiver device to direct the manner by which the receiver device should perform decoding and other video processing of a received video signal. Such information may include the cut-off frequency associated with transform and quantization operations in accordance with video encoding associated with a video signal that is transmitted from a transmitter device to a receiver device. In addition, further instruction may be provided from a transmitter device to receiver device including a number of times that one or more portions or sub-portions of the video signal should be replicated and/or scaled, one or more portions or sub-portions of the video signal that should be replicated or scaled (including, as applicable, upper and lower frequency bounds associated with any such sub-portions), one or more amounts or types of scaling to be applied to one or more portions or sub-portions of the video signal, a number of times that one or more portions or sub-portions of the video signal should be replicated and/or scaled, etc. As may be understood, any of a number of different types of information, including control information (e.g., magnitude(s) as may be employed for scaling(s), frequency range(s) for reconstruction of a high-frequency spectral envelope, etc.), may be provided from a transmitter device to receiver device for directing operation of the receiver device.

FIG. 18, FIG. 19, FIG. 20A, and FIG. 20B illustrate various embodiments of methods for performing video processing (e.g., within one or more devices)

Figure 18:
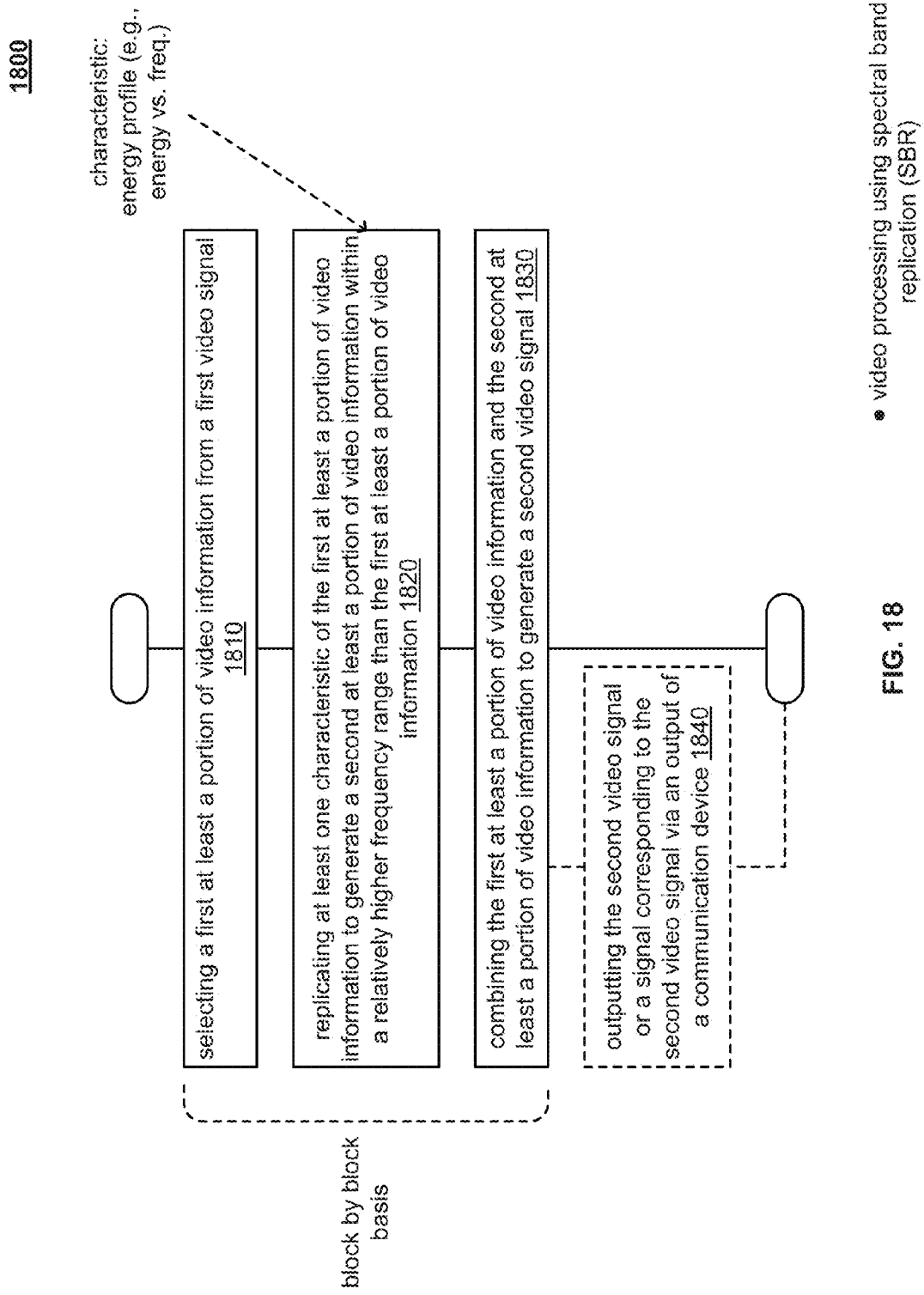

Referring to method 1800 of FIG. 18, the method 1800 begins by selecting a first at least a portion of video information from a first video signal, as shown in a block 1810.

The method 1800 continues by replicating at least one characteristic of the first at least a portion of video information to generate a second at least a portion of video information within a relatively higher frequency range than the first at least a portion of video information, as shown in a block 1820. Such a characteristic may correspond to an energy profile of at least one portion of the first video signal (e.g., energy as a function of frequency, such as in accordance with FIGS. 13-17), and such description referenced in the written description associated with other diagrams.

The method 1800 then operates by combining the first at least a portion of video information and the second at least a portion of video information to generate a second video signal, as shown in a block 1830. The video processing operations as described herein may be performed in any of a variety of bases, including on a block by block basis (or via any other partitioning of one or more video signals).

In certain embodiments, the method 1800 may also continue by outputting the second video signal or a signal corresponding to the second video signal via an output of a communication device, as shown in a block 1840.

Figure 19:
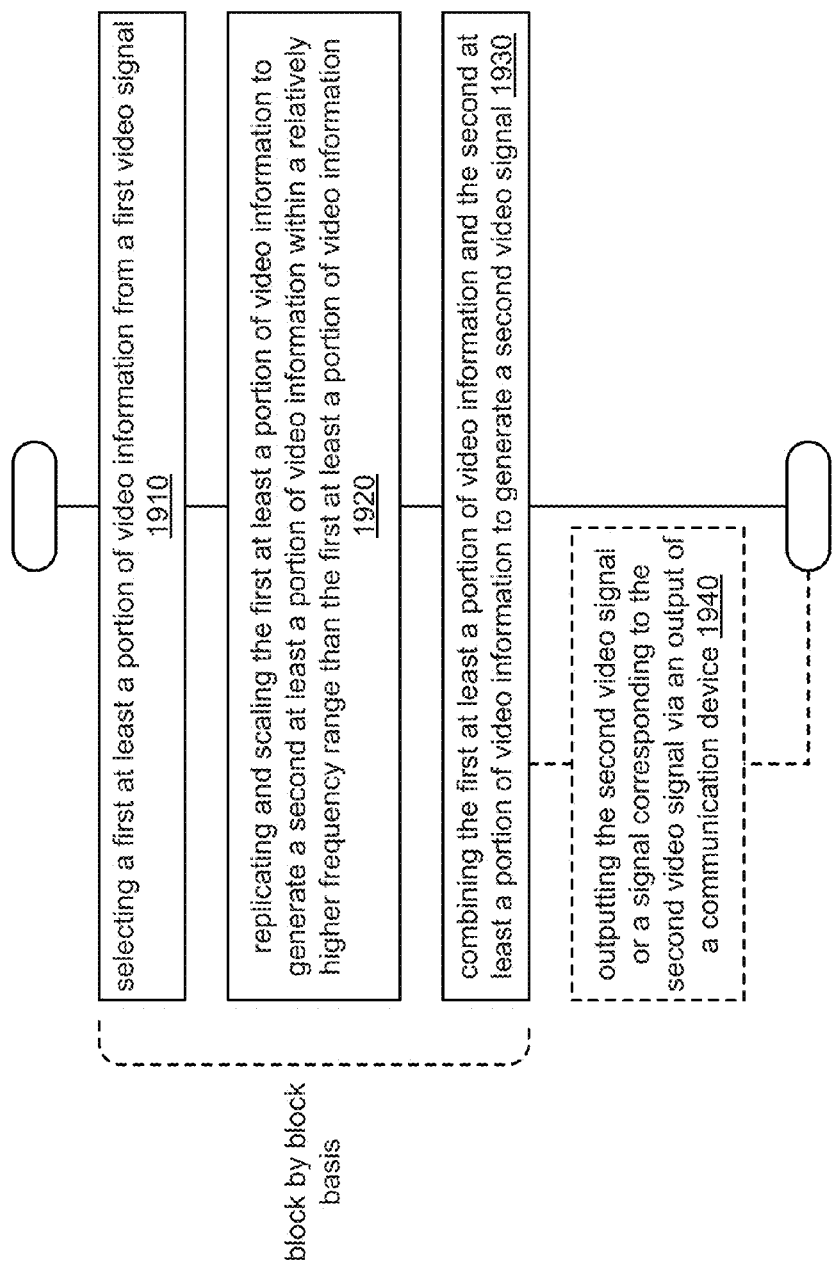

Referring to method 1900 of FIG. 19, the method 1900 begins by selecting a first at least a portion of video information from a first video signal, as shown in a block 1910.

The method 1900 continues by replicating and scaling the first at least a portion of video information to generate a second at least a portion of video information within a relatively higher frequency range than the first at least a portion of video information, as shown in a block 1920.

The method 1900 then operates by combining the first at least a portion of video information and the second at least a portion of video information to generate a second video signal, as shown in a block 1930. The video processing operations as described herein may be performed in any of a variety of bases, including on a block by block basis (or via any other partitioning of one or more video signals).

In certain embodiments, the method 1900 may also continue by outputting the second video signal or a signal corresponding to the second video signal via an output of a communication device, as shown in a block 1940.

Referring to method 2000 of FIG. 20A, the method 2000 begins by employing a first subset of the first at least a portion of video information of a first video signal to generate a first subset of the second at least a portion of video information within a first relatively higher frequency range than the first at least a portion of video information in accordance with generating a second video signal, as shown in a block 2010.

The method 2000 continues by employing a second subset of the first at least a portion of video information of the first video signal to generate a second subset of the second at least a portion of video information within a second relatively higher frequency range than the first at least a portion of video information in accordance with generating a second video signal, as shown in a block 2020.

Referring to method 2001 of FIG. 20B, the method 2001 begins by employing a first at least a portion of video information of a first video signal to generate a first subset of a second at least a portion of video information within a first relatively higher frequency range than the first at least a portion of video information in accordance with generating a second video signal, as shown in a block 2011.

The method 2001 then operates by employing the first at least a portion of video information of a first video signal to generate a second subset of the second at least a portion of video information within a second relatively higher frequency range than the first at least a portion of video information in accordance with generating a second video signal, as shown in a block 2021.

It is also noted that the various operations and functions as described with respect to various methods herein may be performed within a communication device, such as using a baseband processing module and/or a processing module implemented therein and/or other component(s) therein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A communication device comprising:
a communication interface;
processor, at least one of the processor or the communication interface configured to:
 receive a first video signal from another communication device;
 select a first portion of video information from the first video signal, wherein the first portion of video information is included within a first frequency range located below a cutoff frequency;
 replicate the first portion of video information to generate a copy of the first portion of video information that has a first energy profile that is same as the first portion of video information and scale downward the copy of the first portion of video information using at least one scale factor to generate a second portion of video information within a second frequency range that is relatively higher than the first frequency range;

combine the first portion of video information and the second portion of video information to generate a second video signal, wherein the second portion of video information is adjacently located to the first portion of video information within the second video signal, a second energy profile of the second video signal as a function of frequency includes a smooth transition between the first portion of video information and the second portion of video information, and the second energy profile of the second video signal as a function of frequency is substantially monotonically decreasing with increasing frequency; and receive, from the another communication device, information that specifies at least one of the first frequency range, the cutoff frequency, the second frequency range that is relatively higher than the first frequency range, or the at least one scale factor.

2. The communication device of claim 1, wherein the at least one of the processor or the communication interface is further configured to:

employ a first subset of the first portion of video information to generate a first subset of the second portion of video information within a third frequency range that is relatively higher than the first frequency range; and employ a second subset of the first portion of video information to generate a second subset of the second portion of video information within a fourth frequency range that is relatively higher than the first frequency range.

3. The communication device of claim 1, wherein the at least one of the processor or the communication interface is further configured to:

employ the first portion of video information to generate a first subset of the second portion of video information within a third frequency range that is relatively higher than the first frequency range and a second subset of the second portion of video information within a fourth frequency range that is relatively higher than the first frequency range.

4. The communication device of claim 1 further comprising:

a video decoder.

5. The communication device of claim 1, wherein the communication device is operative within at least one of a satellite communication system, a wireless communication system, a wired communication system, a fiber-optic communication system, or a mobile communication system.

6. A communication device comprising:

a communication interface;

a processor, at least one of the processor or the communication interface configured to:

receive a first video signal from another communication device;

select a first portion of video information from the first video signal, wherein the first portion of video information is included within a first frequency range located below a cutoff frequency;

replicate at least one characteristic of the first portion of video information to generate a copy of the at least one characteristic of the first portion of video information;

process the copy of the at least one characteristic of the first portion of video information to generate a second portion of video information within a second frequency range that is relatively higher than the first frequency range including to scale downward a copy of the first portion of video information using at least one scale factor to generate the second portion of video information;

combine the first portion of video information and the second portion of video information to generate a second video signal, wherein the second portion of video information is adjacently located to the first portion of video information within the second video signal, an energy profile of the second video signal as a function of frequency includes a smooth transition between the first portion of video information and the second portion of video information, and the energy profile of the second video signal as a function of frequency is substantially monotonically decreasing with increasing frequency; and receive, from the another communication device, information that specifies at least one of the first frequency range, the cutoff frequency, the second frequency range that is relatively higher than the first frequency range, or the at least one scale factor.

7. The communication device of claim 6, wherein the at least one of the processor or the communication interface is further configured to:

replicate and scale the first portion of video information to generate the second portion of video information.

8. The communication device of claim 6, wherein the at least one characteristic of the first portion of video information corresponding to another energy profile as a function of frequency.

9. The communication device of claim 6, wherein the at least one of the processor or the communication interface is further configured to:

employ a first subset of the first portion of video information to generate a first subset of the second portion of video information within a third frequency range that is relatively higher than the first frequency range; and employ a second subset of the first portion of video information to generate a second subset of the second portion of video information within a fourth frequency range that is relatively higher than the first frequency range.

10. The communication device of claim 6, wherein the at least one of the processor or the communication interface is further configured to:

employ the first portion of video information to generate a first subset of the second portion of video information within a third frequency range that is relatively higher than the first frequency range and a second subset of the second portion of video information within a fourth frequency range that is relatively higher than the third frequency range.

11. The communication device of claim 6, wherein the at least one of the processor or the communication interface is further configured to:

operate on a block by block basis to process the first video signal to generate the second video signal;

process a first at least one block of the first video signal to generate the second video signal using a first scale factor to generate a first subset of the second portion of video information; and process a second at least one block of the first video signal to generate the second video signal using a second scale factor to generate a second subset of the second portion of video information.

12. The communication device of claim 6 further comprising:

a video decoder.

13. The communication device of claim 6, wherein the communication device is operative within at least one of a satellite communication system, a wireless communication system, a wired communication system, a fiber-optic communication system, or a mobile communication system.

14. A method for execution by a communication device, the method comprising:
receiving, via a communication interface of the communication device and from another communication device, a first video signal;
selecting a first portion of video information from the first video signal, wherein the first portion of video information is included within a first frequency range located below a cutoff frequency;
replicating at least one characteristic of the first portion of video information to generate a copy of the at least one characteristic of the first portion of video information;
processing the copy of the at least one characteristic of the first portion of video information to generate a second portion of video information within a second frequency range that is relatively higher than the first frequency range including scaling downward a copy of the first portion of video information using at least one scale factor to generate the second portion of video information;
combining the first portion of video information and the second portion of video information to generate a second video signal, wherein the second portion of video information is adjacently located to the first portion of video information within the second video signal, an energy profile of the second video signal as a function of frequency includes a smooth transition between the first portion of video information and the second portion of video information, and the energy profile of the second video signal as a function of frequency is substantially monotonically decreasing with increasing frequency; and
receiving, via a communication interface of the communication device and from the another communication device, information that specifies at least one of the first frequency range, the cutoff frequency, the second frequency range that is relatively higher than the first frequency range, or the at least one scale factor.

15. The method of claim 14 further comprising:
replicating and scaling the first portion of video information to generate the second portion of video information.

16. The method of claim 14, wherein the at least one characteristic of the first at least a portion of video information corresponding to another energy profile as a function of frequency.

17. The method of claim 14 further comprising:
employing a first subset of the first portion of video information to generate a first subset of the second portion of video information within a third frequency range that is relatively higher than the first frequency range; and
employing a second subset of the first portion of video information to generate a second subset of the second portion of video information within a fourth frequency range that is relatively higher than the first frequency range.

18. The method of claim 14 further comprising:
employing the first portion of video information to generate a first subset of the second portion of video information within a third frequency range that is relatively higher than the first frequency range and a second subset of the second portion of video information within a fourth frequency range that is relatively higher than the third frequency range.

19. The method of claim 14 further comprising:
processing the first video signal on a block by block basis for generating the second video signal;
processing a first at least one block of the first video signal to generate the second video signal using a first scale factor to generate a first subset of the second portion of video information; and
processing a second at least one block of the first video signal to generate the second video signal using a second scale factor to generate a second subset of the second portion of video information.

20. The method of claim 14, wherein the communication device is operative within at least one of a satellite communication system, a wireless communication system, a wired communication system, a fiber-optic communication system, or a mobile communication system.

* * * * *